(12) United States Patent
Damask

(10) Patent No.: US 6,377,719 B1
(45) Date of Patent: Apr. 23, 2002

(54) APPARATUS AND METHOD FOR CONTROLLED GENERATION OF POLARIZATION MODE DISPERSION

(75) Inventor: Jay N Damask, Annapolis, MD (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/516,396

(22) Filed: Mar. 1, 2000

(51) Int. Cl.[7] .................................................. G02B 6/00
(52) U.S. Cl. ............................................ 385/11; 385/24
(58) Field of Search ....................................... 385/24, 11

(56) References Cited

U.S. PATENT DOCUMENTS 6,055,101 A * 4/2000 Bergmann et al.
6,125,923 A1 * 4/2001 Li

* cited by examiner

*Primary Examiner*—Hung N. Ngo
(74) *Attorney, Agent, or Firm*—Moser, Patterson & Sheridan L.L.P.

(57) ABSTRACT

A polarization-mode-dispersion emulator in accordance with the principles of the present invention includes a plurality of PMD-generating stages aligned in cascade so as to form a clear light-path through the stage concatenation. Each PMD-generating stage includes an optical birefringent crystal or crystals for the purpose of imparting differential group delay and a polarization-rotating plate such as a half-wave waveplate for the purpose of imparting state-of-polarization rotation from one PMD-generating stage to the next. The polarization-rotating plates are mounted to rotation apparatuses and a controller coordinates the relative rotation of each waveplate for the purpose of generating PMD in a controlled manner.

35 Claims, 21 Drawing Sheets

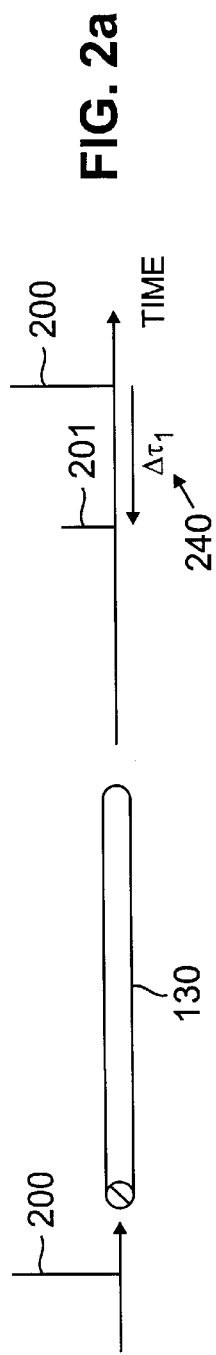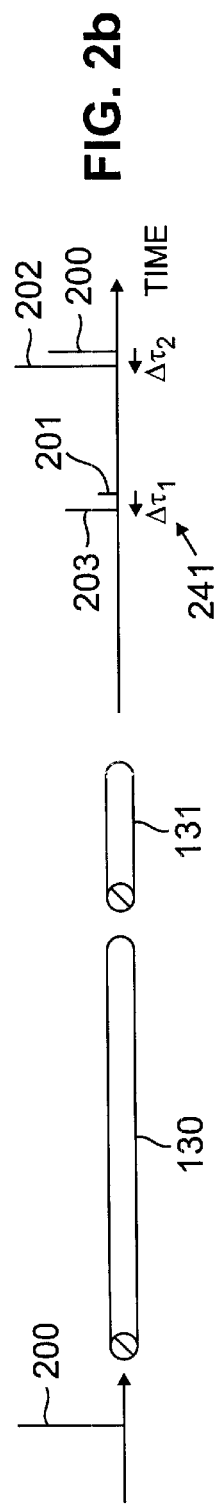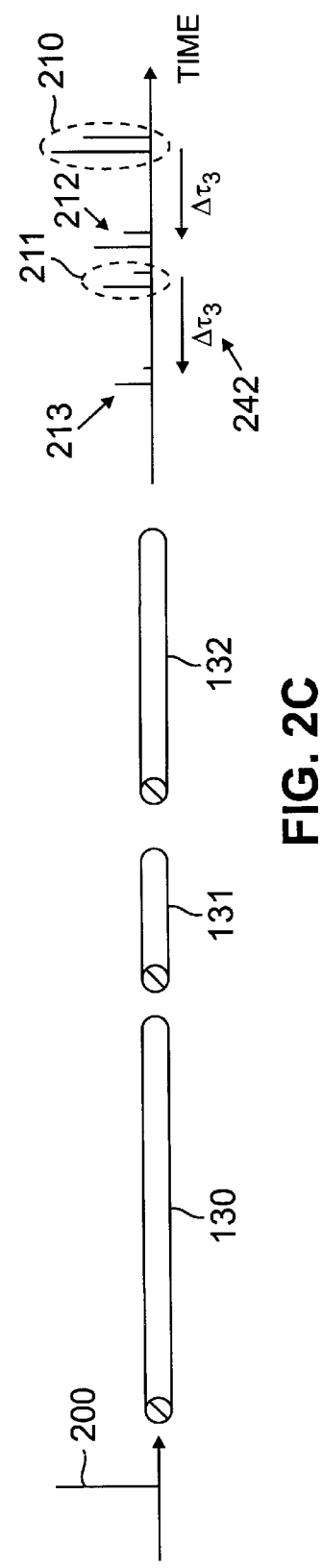

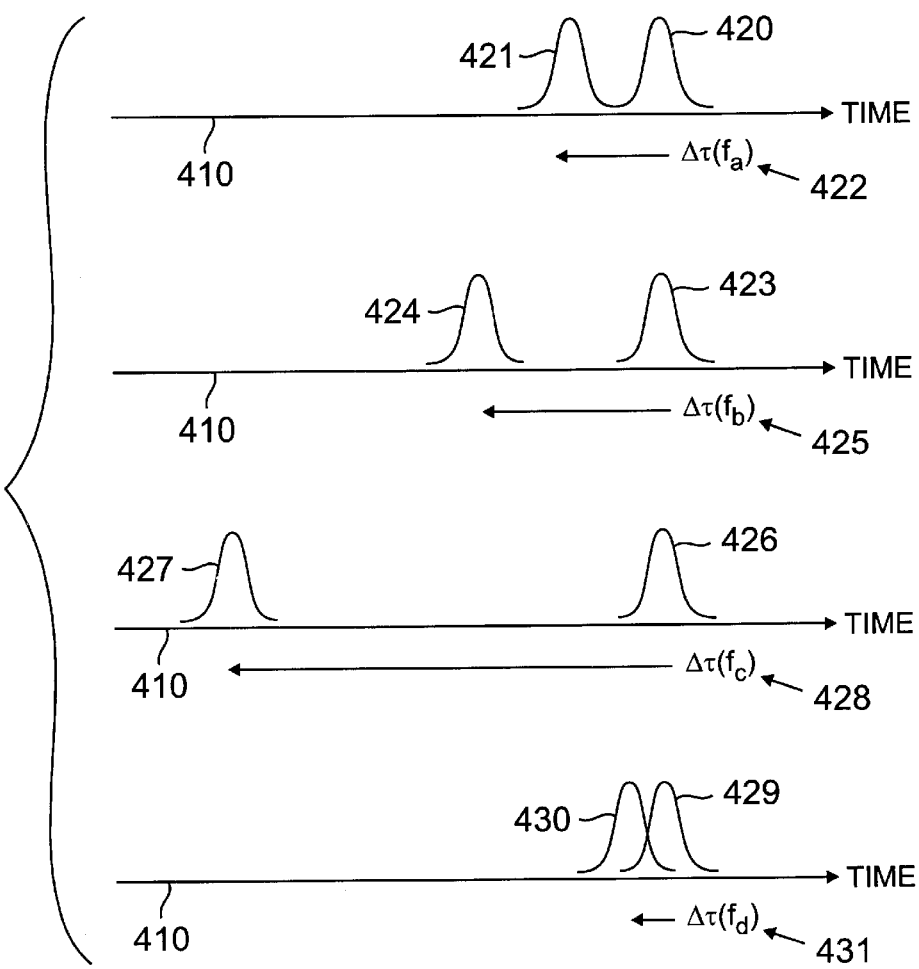

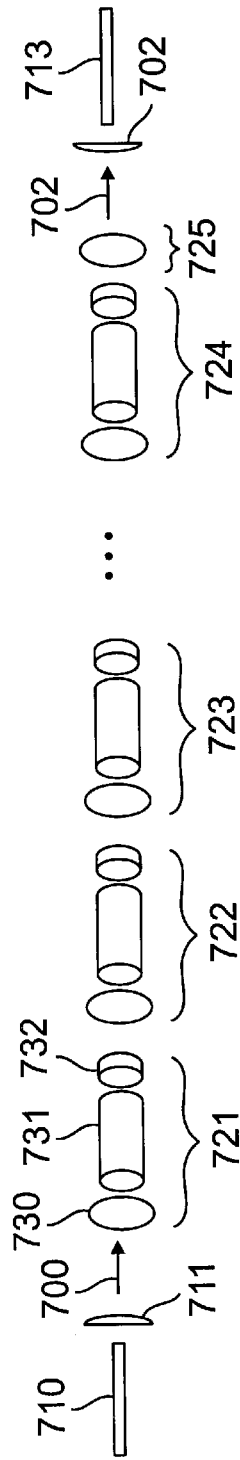
FIG. 7b
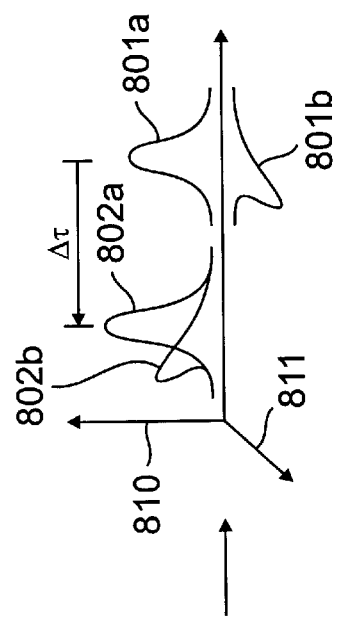
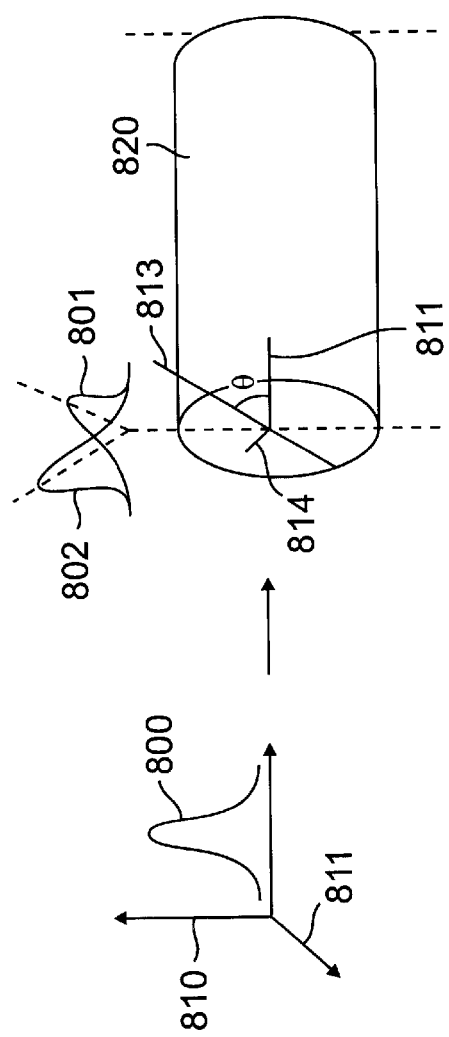
FIG. 8a

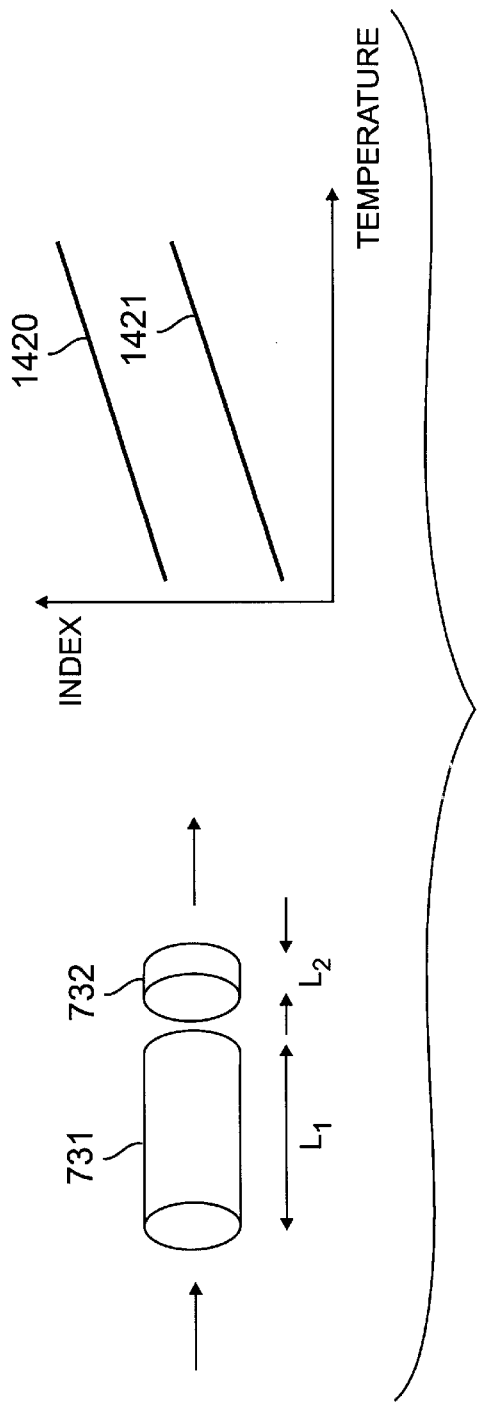
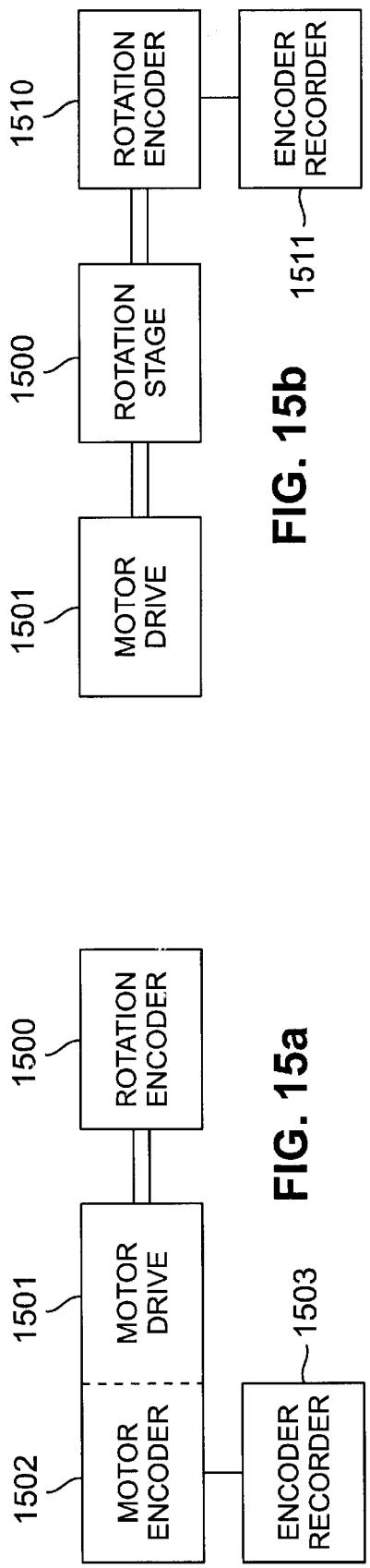
FIG. 14c
FIG. 15b
FIG. 15a

APPARATUS AND METHOD FOR CONTROLLED GENERATION OF POLARIZATION MODE DISPERSION

FIELD OF THE INVENTION

This invention relates to optical fiber signal transmission and, in particular, to the generation of polarization-mode dispersion (PMD) to emulate the natural occurrence of PMD in optical fiber; and to use PMD emulation to compensate for PMD generated by optical fiber.

BACKGROUND OF THE INVENTION

Polarization-Mode Dispersion (PMD) is a fiber-optic telecommunication system impairment which can prevent the transmission of high data rates, such as 10 Gb/s and 40 Gb/s. The effect of PMD originates with the inherent, built-in residual birefringence present in all single-mode optical fiber. Over the course of pulse transmission, PMD interacts with a transmitted optical pulse in such a way as to distort the shape of the pulse. The consequences vary with the degree of pulse distortion, from small penalties in transmission fidelity, to complete system outage. Accordingly, in order to transmit optical pulses at rates above 2.5 Gb/s, either the quality of the optical fiber must be sufficiently high so as to not introduce significant PMD or a PMD-compensating apparatus must be inserted in the transmission system, for example, between the end of the fiber-optic transmission line and the input to the optical receiver.

In order to transmit at a rate of 10 Gb/s over legacy fiber (that is, currently installed fiber), a PMD compensator (PMDC) is frequently necessary to recover acceptable system performance. It is generally believed that in order to transmit at a rate of 40 Gb/s and above over the most recently available fiber, a PMDC at the receiver may be essential. Accordingly, a PMDC is a desirable apparatus. A means for laboratory and factory testing of a PMDC is, consequently, a desirable apparatus. Such an apparatus is herein referred to as a PMD Emulator (PMDE).

Indeed a PMDC and PMDE are quite similar because both apparatuses must generate PMD; the former apparatus must generate PMD in order to cancel the accrued fiber PMD, the latter apparatus must generate PMD in order to test a PMDC. However, the generation of PMD for a PMDC and PMDE does have practical differences. A PMDC further requires the generation of a control signal which is used to monitor the PMD cancellation, and further requires a feedback system and control algorithm which automatically corrects for changing PMD. A PMDE further requires the precise and repeatable generation of PMD, and may not require the speed of change which may be necessary for a PMDC. A PMDE further requires the synthesis of the PMD effect so as to approximate the PMD of a real fiber as closely as possible. A PMDE further requires a performance which is both known and repeatable so as to test and verify the performance of a PMDC.

The term "PMDC" will refer herein to an apparatus which consists of: 1) a PMD generating mechanism; 2) a control-signal generating mechanism; and 3) a feedback control mechanism and algorithm which changes the PMD generating mechanism so as to cancel the PMD of the fiber-optical link. The term "PMDE" will refer solely to a PMD generating mechanism, which includes a means to change the state of PMD. It is recognized that a PMDE can be transformed into a PMDC through the addition of a control-signal generating mechanism and a feedback control mechanism and algorithm.

Polarization-mode dispersion is the composite phenomenon of two interleaved effects. One effect is the projection of an input state-of-polarization (SOP) onto a birefringent dielectric system. The other effect is an accrued differential temporal delay between two orthogonal polarization states. FIG. 1a illustrates an input optical pulse 100 with an arbitrary input SOP 120. The pulse 100 is incident upon an optical birefringent medium 110 with orthogonal birefringent axes fast 121 and slow 122. The terms "fast" and "slow" refer to the speed of the optical pulse as projected on either axis: the pulse on one axis propagates faster than the pulse of the other axis due to the difference in refractive index, the latter which is due to the inherent birefringence of the fiber. The projection of the input SOP 120 onto the birefringent interface 110 results in the formation of two orthogonally polarized pulses 101 and 102. The balance of energy on the two orthogonal polarization axes is dictated by the relative orientation of the input SOP 120 and the birefringent axes 121, 122 at the interface 110. FIG. 1a illustrates the phenomena of polarization projection at a birefringent interface.

FIG. 1b illustrates an example of "simple" PMD. A short section of optical fiber 130 and the effect of PMD on an optical pulse 100 is herein illustrated. The optical pulse 100 has its SOP 120 projected onto the birefringent axes of the fiber 110, resulting in pulse 101 on fast axis 121 and pulse 102 on slow axis 122. The birefringence of fiber 130 causes a relative temporal delay between the two pulses 101 and 102. This temporal delay is referred to as differential-group delay (DGD). At the end of optical fiber 130 pulses 101 and 102 exhibit a DGD of magnitude Δτ 140. The magnitude of DGD 140 depends on the magnitude of the birefringence and the length of fiber 130 over which the birefringence does not significantly change. The present instance of a single polarization projection followed by a single differential-group delay stage is denoted as simple, one one-stage, PMD.

FIG. 2 illustrates the concatenation of several simple PMD stages to form a more complex PMD response. FIG. 2a illustrates substantially the same PMD as FIG. 1b but the orthogonal polarization states are not explicitly indicated. FIG. 2a illustrates a pulse 200 input to birefringent fiber segment 130. The PMD of this fiber segment 130 generates DGD 240 between two output pulses 200 and 201. FIG. 2b illustrates the concatenation effect of two birefringent fiber segments 130 and 131 possessing dissimilar lengths and birefringent orientation. Fiber segment 130 produces two pulses 200 and 201 with DGD 240. Fiber segment 131 produces two pulses for each pulse input, resulting in four pulses 200, 201, 202, 203. The time delay between pulse images 200 and 202, and 201 and 203, is the DGD 241 of fiber segment 131. FIG. 2c adds a third fiber segment 132 with dissimilar length and birefringent axis orientation. Again, each input pulse 200, 201, 202, 203 to fiber segment 132 is copied and each pair 210, 211 is delayed by DGD 242, forming four pulse pairs 210, 211, 212, 213. Note that at each interface between fiber segments, the polarization projection alters the balance of energy between that on the incident SOP and that on the projected coordinates; thus, the variation in pulse amplitudes.

The fiber within a typical fiber-optical link is composed of tens or hundreds of fiber segments joined in series much as those in FIG. 2c. The time-domain representation becomes difficult to extend to such a fiber because of the geometric increase in the number of pulses that is output from a long fiber link. The appropriate alternative representation is in the frequency domain. FIGS. 3a and 3b illustrate the customary technical representation of the PMD effect in the frequency domain. The production of multiple pulses with various relative temporal delays is Fourier transformed into the spectrum of DGD, FIG. 3a. The magnitude of DGD 301 is plotted as a function of frequency 300. The relative energies of the output pulses and their composite state-of-polarization is represented by the Poincare-sphere representation of Principal States of Polarization (PSP). The PSP is used to represent the overall birefringent axes of a whole fiber link at each frequency. If an input sinusoidal optical wave has an SOP which aligns to the PSP of the fiber which corresponds to the frequency of the optical wave, then the energy of the input optical wave is completely transferred to only one PSP axis. Any other input SOP will cause a splitting of the input pulse energy onto the two orthogonal PSPs of the fiber. FIG. 3b illustrates the Poincare sphere 310, which is a suitable representation of states-of-polarization, and PSP 1 vector of one frequency, 320, and PSP 2 vector of another frequency, 321. The direction of the vector is the Principal State of Polarization at one frequency. The length of the vector is the DGD 301 at that frequency 300. The PSP of the fiber changes for each frequency, mapping a contour of PSPs 330.

FIG. 4a illustrates DGD spectrum 301 on frequency axis 300. The optical signal pulse spectrum 400 is indicated in relation to the DGD spectrum. Four frequencies are considered 401, 402, 403, 404. FIG. 4b illustrates the temporal delay between optical signals at each particular frequency 401–404. Note that this is illustrative, because an optical signal at one particular frequency is a sinusoidal wave and not a pulse; a pulse is used here figuratively. Consider frequency 401 and the result of DGD 301 on a pulse in time. On time axis 410 pulses 420 and 421 experience relative time delay 422 in accordance with the value of DGD at frequency 401 On time axis 410 pulses 423 and 424 experience a relative time delay 425 in accordance with the value of DGD at frequency 402. On time axis 410 pulses 426 and 427 experience a relative time delay 428 in accordance with the value of DGD at frequency 403. On time axis 410 pulses 429 and 430 experience a relative time delay 431 in accordance with the value of DGD at frequency 404. Each impact of distinct relative temporal delays 422, 425, 428, 431, for each frequency component of optical signal pulse 400 can cause significant pulse distortion. Note that in FIG. 4b all pulse heights are all equal. This is for illustrative purposes and does not show the complete effect.

FIG. 5a illustrates the PSP "spectrum" 330 on the Poincare sphere 310 as it may vary from PSP 1, 320, to PSP 2, 321, as a function of frequency. Four frequencies on the PSP spectrum 330 are indicated, 401–404. Each frequency is coincident with the frequency illustrated in FIG. 4a. The pulse input SOP vector is indicated 500. At each frequency 401–404 the input pulse SOP is projected onto the PSP vector. The projection results in a power rebalancing between two orthogonal PSPs. FIG. 5b illustrates the combined effect of DGD and SOP-to-PSP projection. Input SOP 500 is projected at frequency 401 in such a manner as to rebalance the pulse energies as indicated by pulses 520, 521. Pulses 520, 521 experience DGD 422. Input SOP 500 is projected at frequency 402 in such a manner as to rebalance the pulse energies as indicated by pulses 522, 523. Pulses 522, 523 experience DGD 425. Input SOP 500 is projected at frequency 403 in such a manner as to rebalance the pulse energies as indicated by pulses 524, 525. Pulses 524, 525 experience DGD 428. Input SOP 500 is projected at frequency 404 in such a manner as to rebalance the pulse energies as indicated by pulses 526, 527. Pulses 526, 527 experience DGD 431. The impact of distinct relative temporal delays at each frequency component of optical signal pulse 400, coupled with the energy rebalancing due to the SOP-to-PSP projection, can cause significant pulse distortion. FIG. 5b illustrates more fully the impact of PMD to an optical pulse.

Prior Art exists for a PMD emulator apparatus. FIG. 6a illustrates a method which concatenates several segments of highly birefringent fiber 601, 602, 603. In order to alter the state of PMD at the output, mechanisms 610, 611, 612, are attached along the fiber length which physically rotate the fiber about its longitudinal axis. Two or more fiber segments are used for this apparatus. The relative rotation of the fiber segments 601, 602, 603 changes the projection of preceding-segment output pulse SOP and following-segment input fiber birefringent axes. The DGD of each fiber segment 601, 602, 603 is fixed. The limitations of this embodiment include: the birefringence of the fiber segments 601–603 is not well controlled during construction and over temperature and aging; the rotation of one fiber segment, e.g. 602, relative to an adjacent fiber segment, e.g. 603, is limited to the torsional breaking point of the fiber, and hence rotation is not endless. In sum, the state of PMD is not easily determined in real-time and not easily repeatable.

FIG. 6b illustrates another apparatus for PMD emulation. Lithium-Niobate (LiNbO) waveguiding polarization controllers 620 transform the SOP from input 630 to output 631. Highly birefringent fiber segments 604, 605, impart DGD. The LiNbO polarization controllers utilize the electro-optic effect of the LiNbO crystal to alter the SOP of the incoming light 630. Electrodes 622 are driven by differential voltage 623 to impart an SOP rotation on waveguide 621. Multiple electrode stages 622 are employed to impart multiple polarization transformations. The limitations of this embodiment include: the actual degree and direction of polarization rotation is not easily monitored and may vary from device to device, the same will change with temperature and aging; the birefringence of the fiber is not well controlled during construction and may change due to environmental effects. In sum, the state of PMD is not easily determined in real-time and not easily repeatable.

FIG. 6c illustrates another apparatus for PMD emulation. A single LiNbO waveguiding polarization controller 620 is employed. Along the length of waveguide 621, between electrodes 622, there is a small degree of DGD which is inherently generated. The design of a device with sufficient number of stages provides for multiple SOP transformation stages and interleaved DGD stages. The limitations of this embodiment include: the SOP transformation from stage to stage is not easily monitored; the actual DGD generation may vary from crystal to crystal; the DGD sections are not easily distinguished from the SOP transformation sections 622. In sum, the state of PMD is not easily determined in real-time and not easily repeatable.

Prior-Art approaches to PMD generation suffer from one or more drawbacks, each of which are sufficient to limit their utility.

SUMMARY

Therefore, it is the object of the present invention to provide a means and apparatus to generate the effect of PMD in a manner which is known, predictable, repeatable, and sufficient to approximate the behavior of optical fiber.

A polarization-mode-dispersion emulation (PMDE) apparatus in accordance with the principles of the present invention includes, briefly and generally, a plurality of PMD-generating stages all positioned to provide a clear light-path through each stage, wherein each PMD-generating stage further includes a first waveplate element, a first birefringent element, and a second waveplate element, all positioned to provide a clear light-path through each element in succession in the order herein listed. To alter the state of PMD which is generated by the apparatus, the waveplate elements are mounted on motorized rotation stages which are operated by a controller that coordinates the waveplate rotation about the axis perpendicular to the birefringent plane. Through rotation of the waveplate elements, the magnitude and modulation of the differential-group delay (DGD) spectrum of the generated PMD can be controlled.

The concatenation of PMD-generating stages provides for the interleaving of two complimentary optical effects which generate PMD: the projection of states-of-polarization onto orthogonal birefringent axes and a differential group delay subsequently generated. In accordance with the present invention, the state of PMD which is generated by the apparatus is controlled by the accurate rotation of waveplates, one or more which precedes each birefringent crystal, and by the accurate construction and selection of birefringent crystals. In one preferred embodiment of the present invention, the differential group delay generated by each birefringent crystals located within the apparatus is substantially of the same magnitude.

According to another aspect of the present invention, the insertion loss through the PMD-generating apparatus does not substantially vary with the rotation of the waveplates. Typically, the attachment of the waveplates to rotation stages does not provide for zero wobble of the waveplate over 360 degrees of rotation. Any residual wobble imparts displacement on the transiting optical beam which in turn generates rotation-dependent loss. As disclosed in the present invention, use of true zero-order single-plate waveplates minimizes rotation-dependent loss while still providing for the rotation of the state-of-polarization from PMD-generating stage to PMD-generating stage.

According to another aspect of the present invention, the accuracy, predictability, programmability, and repeatability of the generated PMD is a distinguishing feature of the disclosed PMD-generating apparatus. The utilization of birefringent crystals and waveplates, whose optical and mechanical properties are well known and stable, and the utilization of high-accuracy rotation stages provided with the measurement and recording of the rotation orientation, together facilitate the predictability of the generated PMD. Moreover, the replacement of the single birefringent crystals with composite crystals, wherein each composite crystal is designed to substantively eliminate temperature variation of the imparted differential-group delay, further enhances the repeatability of the inventive apparatus.

According to another aspect of the present invention, the PMD-generating apparatus of the present invention can be employed to test a PMD compensator (PMDC) apparatus. Through the change of PMD generated by a PMDE, the performance of a PMDC may be determined.

According to another aspect of the present invention, the PMD-generating apparatus of the present invention can be employed as one part of a PMD compensator apparatus, wherein the PMD-generating apparatus receives optical signals impaired by the PMD effect, a detector apparatus receives the optical signals distorted by both the original PMD effect and subsequently the PMD-generating apparatus effect, a detector monitor measures the degree of total PMD present on the optical signal, and a controller rotates at least one waveplate located within the PMD-generating apparatus so as to minimize the degree of total PMD present on the optical signal.

Additional objects, advantages, and features of the various aspects of the present invention will become apparent from the following description of its preferred embodiments, which description should be taken in conjunction with the accompanying drawings.

BRIEF DESCRIPTION OF THE DRAWINGS

The above and further features, aspects, and advantages of the invention will be apparent to those skilled in the art from the following detailed description, taken together with the accompanying drawings in which:

FIGS. 2a, 2b, and 2c illustrate, respectively, the effect of one, two, and three randomly oriented fiber segments on an optical pulse.

and FIG. 4b illustrates the effect of DGD on the optical signal at each of four distinct frequencies.

FIG. 7b illustrates one inventive embodiment of the PMD emulator utilizing a concatenation of birefringent crystals and waveplates.

FIG. 8a illustrates the details of polarization-projection and DGD effects on an optical pulse.

FIG. 14c illustrates the elimination of the birefringent temperature dependence by the appropriate combination of these two crystals.

FIGS. 15a and 15b illustrate block diagrams of a motor drive affixed to a rotation stage, and a rotation encoder and encoder recorder to monitor rotation.

DETAILED DESCRIPTION

Figure 1A:
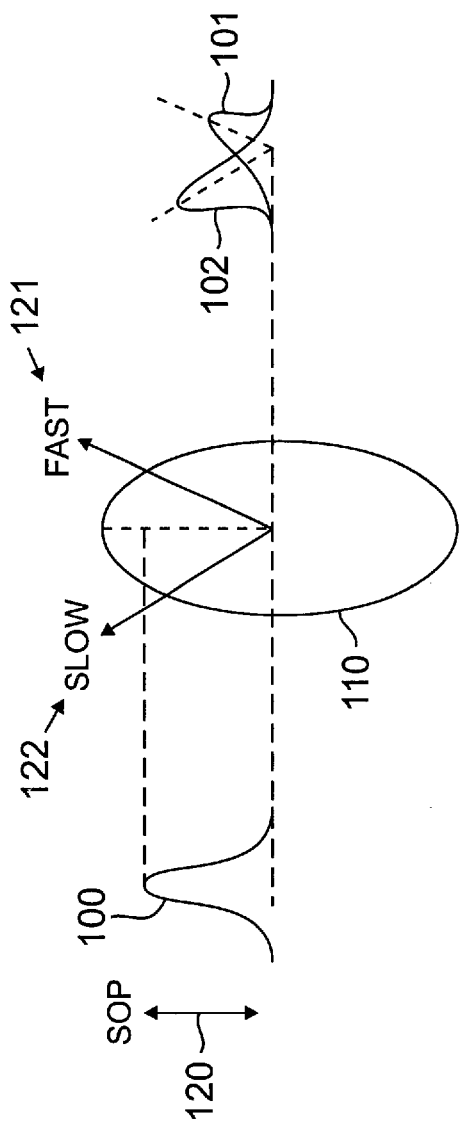
FIG. 1a illustrates the projection of a polarization state onto two orthogonal axes.

Reference will now be made in detail to embodiments of the present invention, examples of which are illustrated in the accompanying drawings, wherein the like reference numerals refer to the like elements throughout.

Figure 7A:
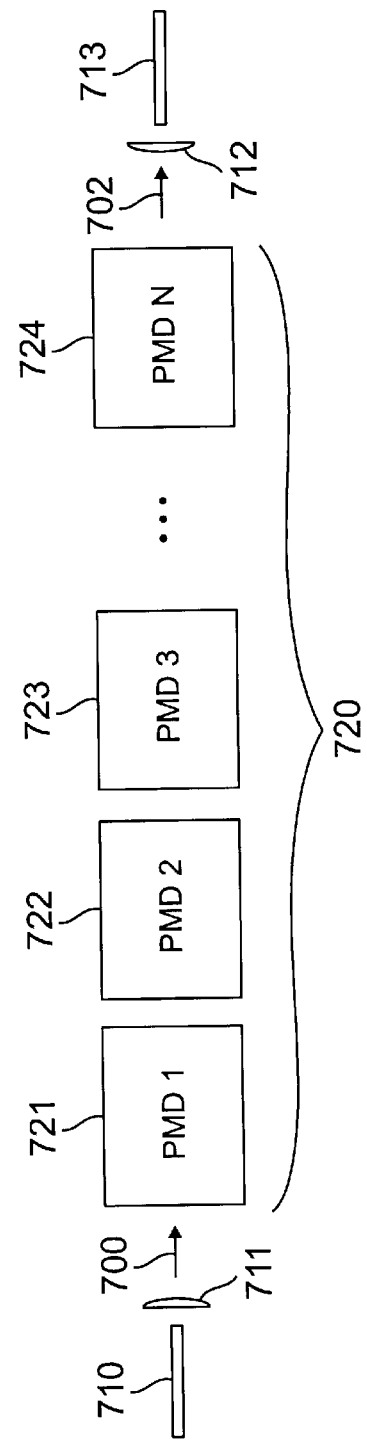
FIG. 7a illustrates a block diagram of a PMD emulator comprised of a plurality of "simple" PMD-generating stages.

FIG. 7a is an illustrative embodiment of a PMD-generating apparatus, wherein light which travels along input fiber 710 is collimated by a lens 711 to form a free-space optical beam 700. PMD-generating apparatus 720 receives optical beam 700. The PMD-generating apparatus 720 further comprises a plurality of simple PMD-generating stages 721, 722, 723, 724. There may be any number of simple PMD-generating stages, preferably two or more. The optical beam 701 that transits the PMD-generating apparatus 720 is received by a focusing lens 712, and is further received by output fiber 713. The PMD-generating apparatus thereby imparts PMD to light beam 702 from light beam 700.

FIG. 7b illustrates a more detailed embodiment of a PMD-generating apparatus. Each simple PMD-generating stage, e.g. 721, further comprises a first waveplate 730, a first birefringent crystal 731, and a second birefringent crystal 732. First waveplate 730 is preferably, but not limited to, a λ/2, or half-wave, waveplate, where λ is the approximate wavelength of optical beam 700.

The birefringent crystals are preferably uniaxial and are cut so that the plane formed by the extraordinary and ordinary crystal axes is perpendicular to the path of the optical beam 700. The purpose of two birefringent crystals 731 and 732, rather that one crystal 731 alone, is to engineer a reduction of the temperature dependence of the PMD-generating stage; this design will be described in the following discussion. The sum length of first and second birefringent crystals 731, 732, is preferably long compared with waveplate 730 so as to exhibit a substantial frequency-dependent polarization transformation. That is, the length of the first and second birefringent crystals 731, 732, is sufficient to produce substantial differential temporal delay between the two orthogonal polarization axes of the crystals. Additionally, the extraordinary axes of birefringent crystals 731 and 732 are preferably aligned with zero or ninety degree difference so as to maintain the production of simple PMD, as well as to maximize the reduction of temperature dependence of the PMD-generating stage.

The concatenation of simple PMD-generating stages 721–724 may further be terminated with last waveplate 725 for reasons that will be shortly explained.

Figure 1B:
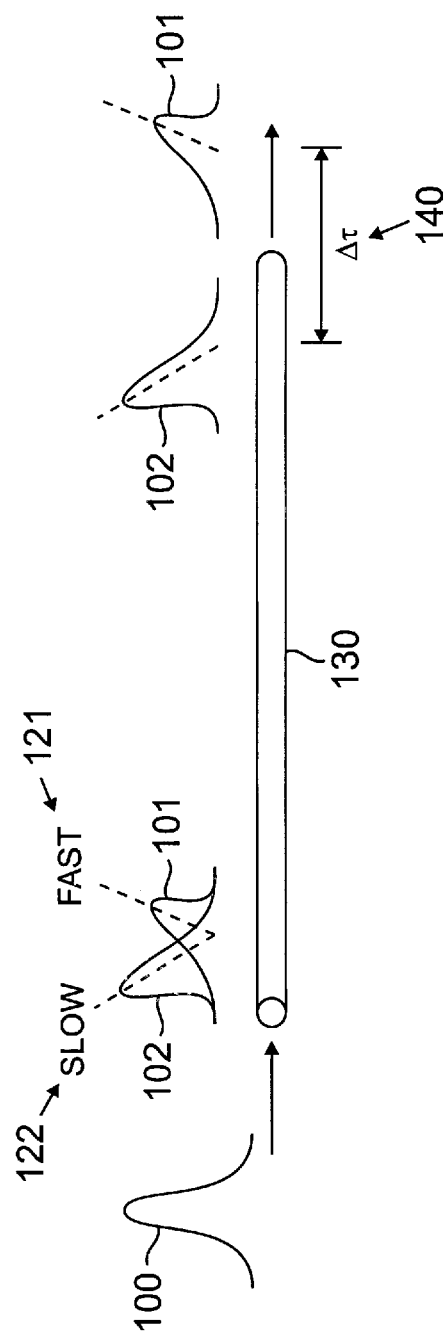
FIG. 1b illustrates the subsequent differential temporal delay between the two projection components resulting from a high-PMD fiber segment.
Figure 3A:
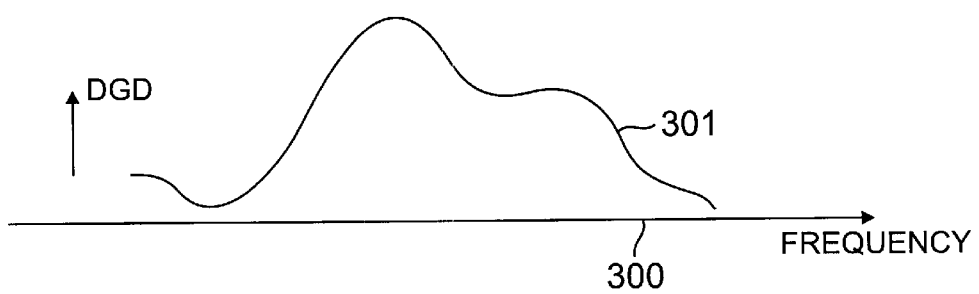
FIG. 3a illustrates a representative differential-group-delay (DGD) spectrum.
Figure 3B:
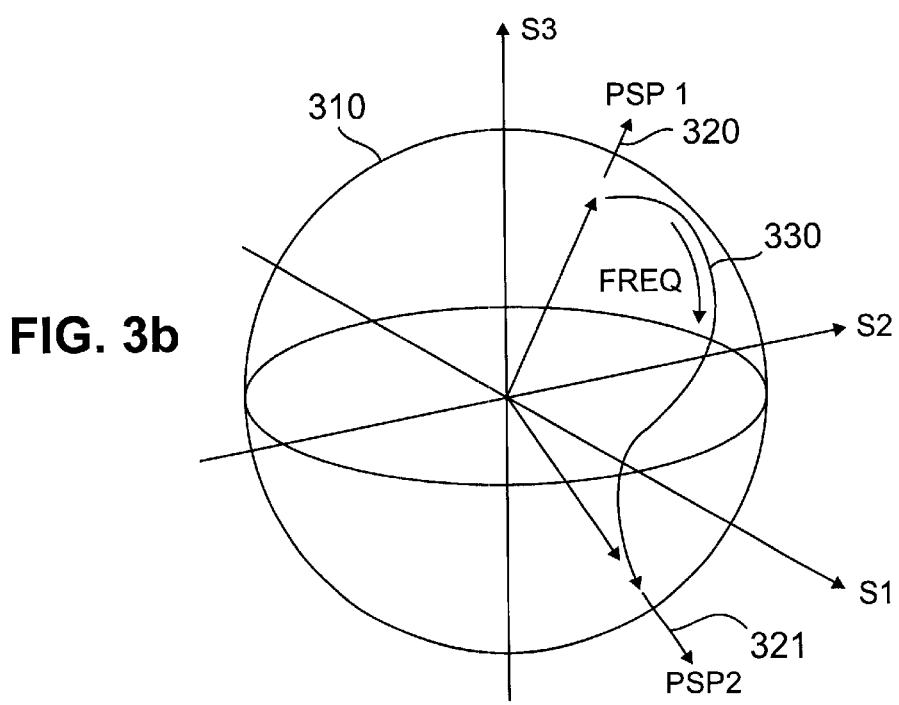
FIG. 3b illustrates a representative principal-states-of-polarization (PSP) spectrum as a contour on the Poincare sphere.
Figure 4A:
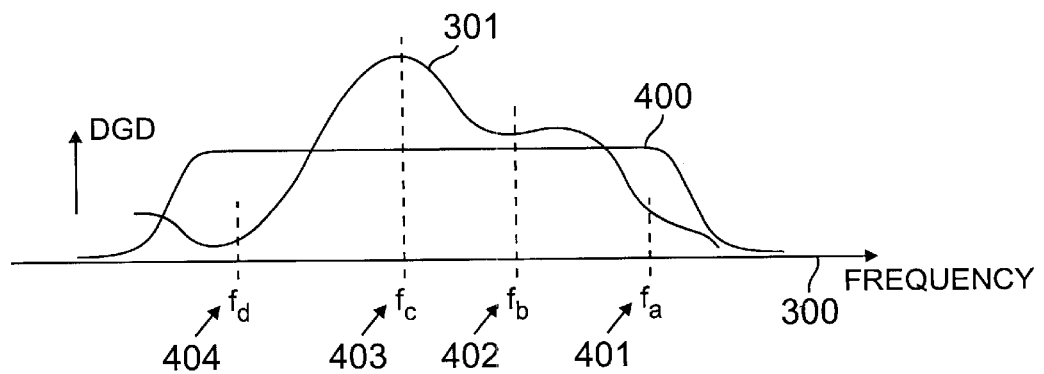
FIG. 4a illustrates a representative optical signal spectrum superimposed on a DGD spectrum.
Figure 5A:
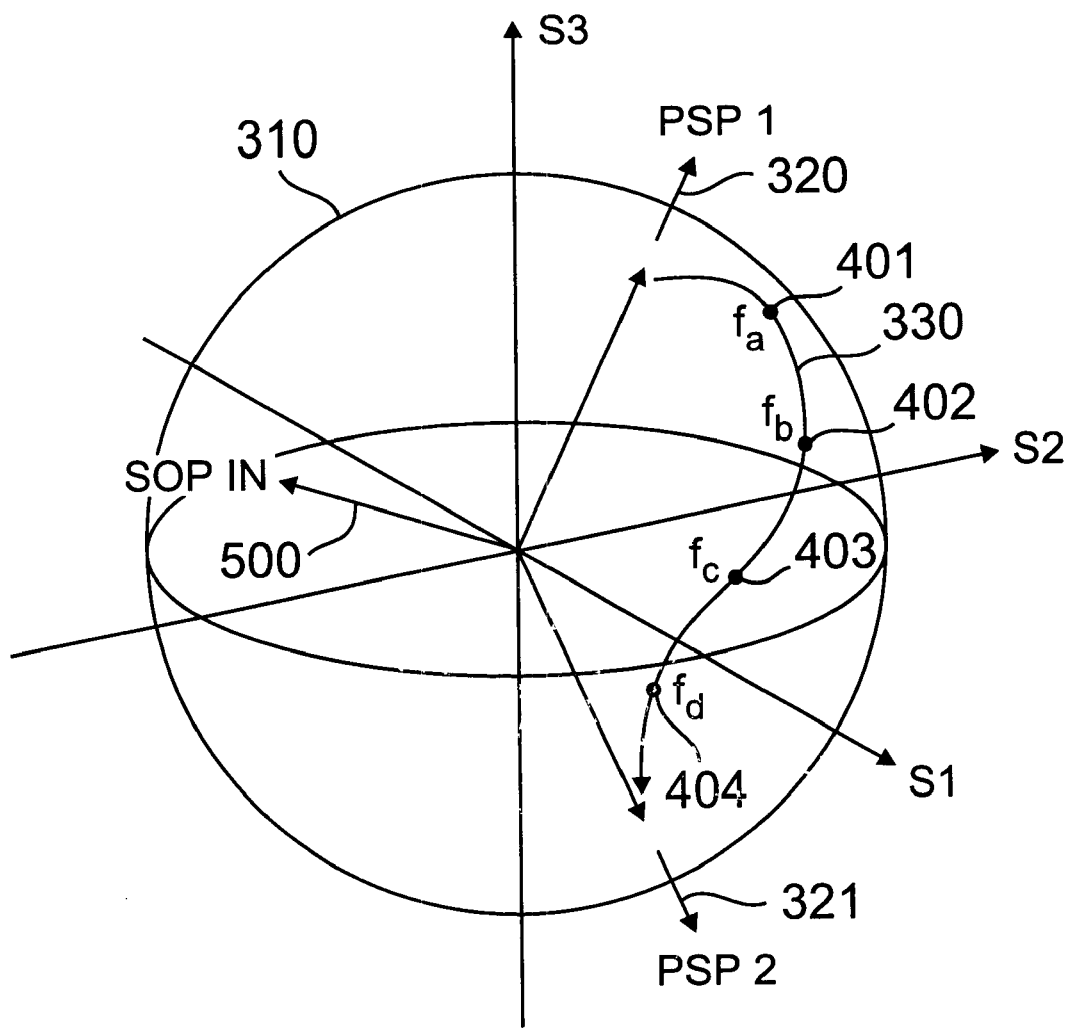
FIG. 5a illustrates a representative input state-of-polarization (SOP) in relation to a representative PSP spectrum, as projected on the Poincare sphere.
Figure 5B:
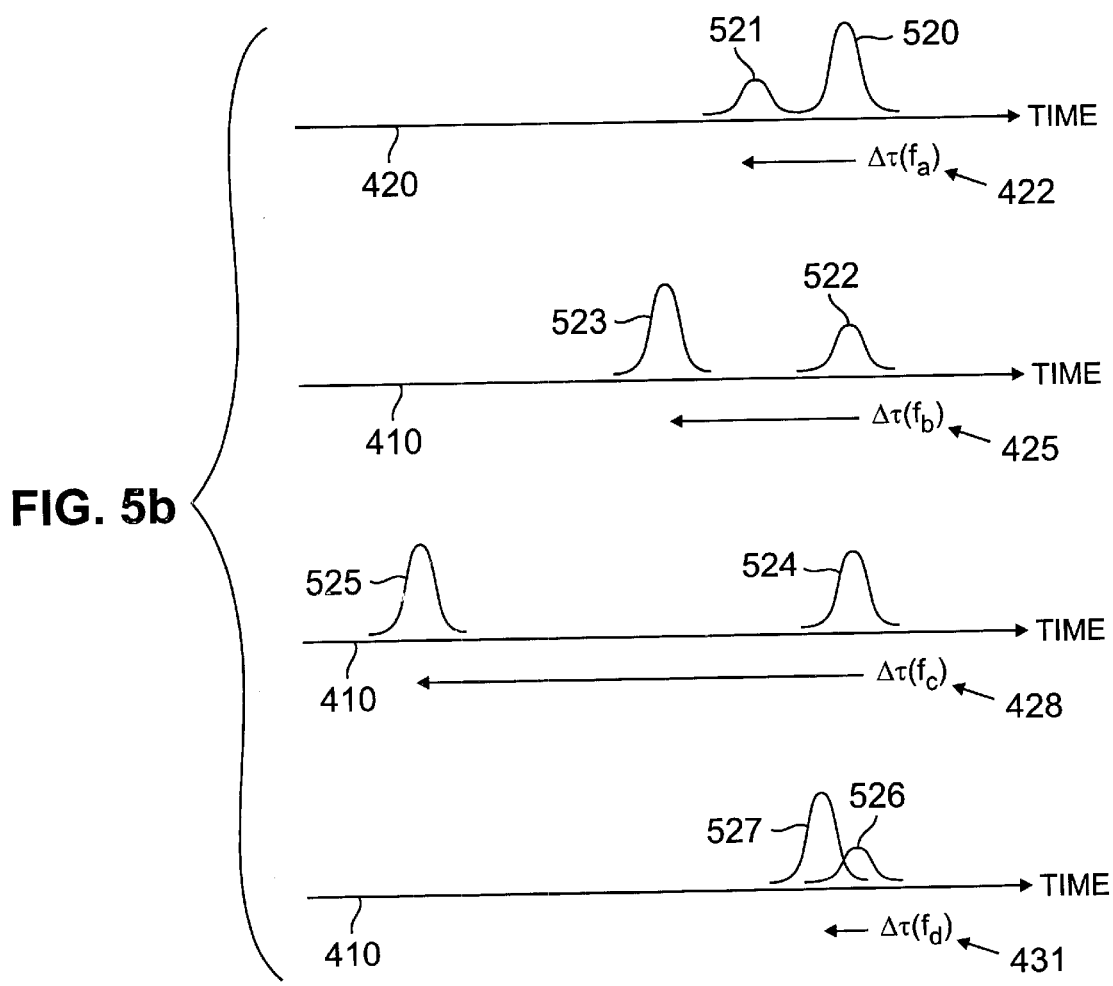
FIG. 5b illustrates, in a representative manner, the combined effect of DGD and PSP-projection on the optical signal at each of four distinct frequencies.
Figure 6A:
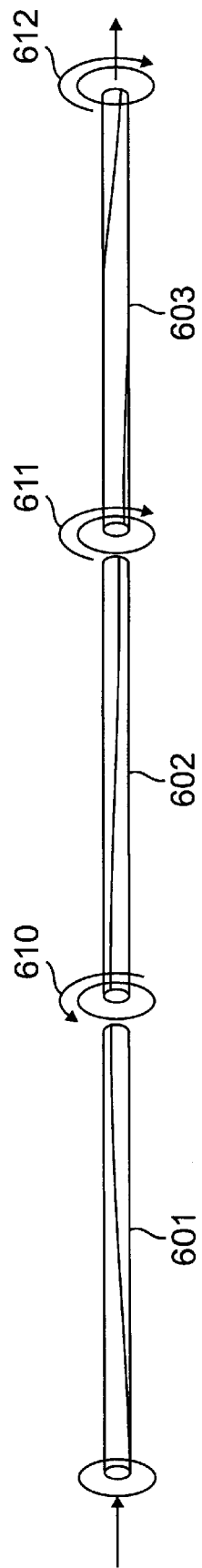
FIG. 6a, 6b, and 6c illustrate Prior Art embodiments of a polarization-mode-dispersion (PMD) emulator.
Figure 6B:
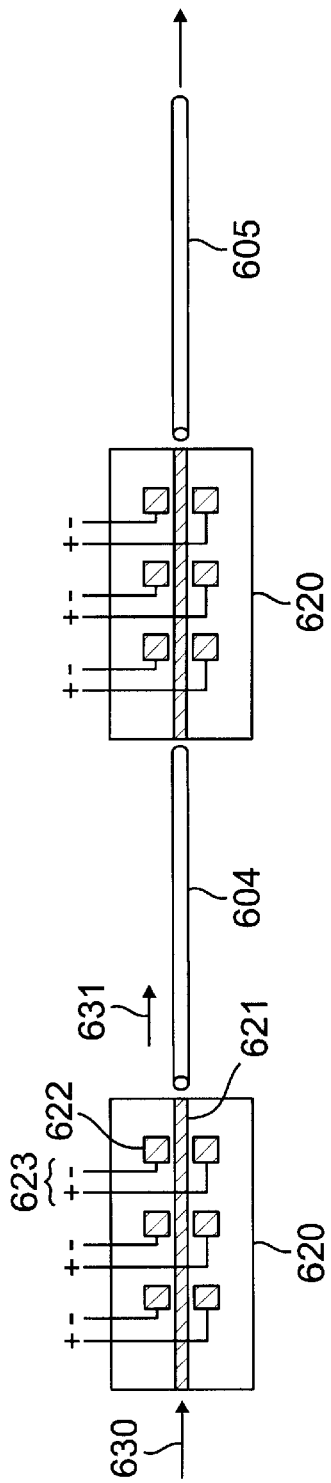
Figure 6C:
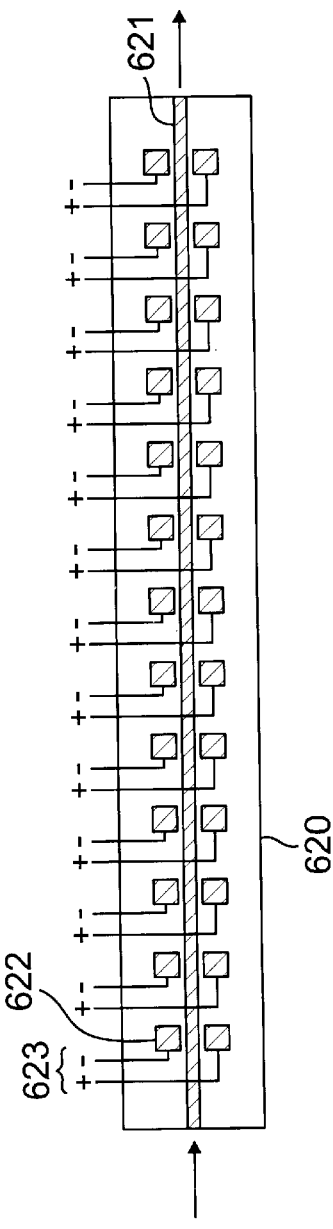

Referring to FIG. 8a, a birefringent crystal may impart simple PMD in a like manner to that illustrated in FIG. 1b and formerly described. State-of-polarization axes 810 and 811 are aligned, heuristically and with no loss of generality, to the SOP of input light 800. A birefringent crystal 820 has extraordinary axis 813 and ordinary axis 814 rotated with respect to the input SOP axis 811. Input light 800 is thereby projected on the face of the birefringent crystal into two orthogonally polarized pulses 801 and 802. Transit through the crystal imparts differential group delay between pulses 801 and 802. The light which is output from crystal 820 is then projected back onto the origin polarization axes 810, 811. The result is two pulses 801 (a, b) and 802 (a, b) which are temporally delayed in relation to one another. Further, pulse 801 (a, b) has polarization components 801a, aligned with axis 810, and 801b, aligned with axis 811; pulse 802 (a, b) has polarization components 802a, aligned with axis 810, and 802b, aligned with axis 811.

Figure 8B:
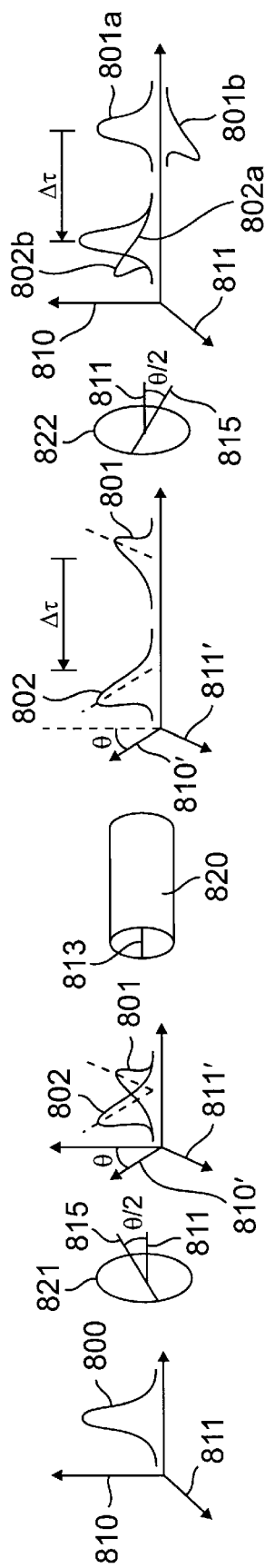
FIG. 8b illustrates the equivalent effect utilizing a preceding and following half-wave waveplate.

An equivalent polarization transformation and differential time delay is shown in FIG. 8b. First waveplate 821 precedes birefringent crystal 820, and second waveplate 822 follows the same crystal 820. For the response of the 821-820-822 configuration to be equivalent to the single rotated 820 birefringent crystal, waveplates 821 and 822 must both be lambda/2, or half-wave, waveplates. The extraordinary axis of the crystal 820, 813, is further rotated to be in alignment with original polarization axis 811. The extraordinary axis 815 of first waveplate 821 is rotated from axis 811 to one-half the angle subtended between axes 813 and 811 of crystal 820 in FIG. 8a. The extraordinary axis 815 of second waveplate 822 is rotated in the opposite direction as first waveplate 821 but with the same magnitude of rotation. The sequence of first waveplate, birefringent crystal, and second waveplate as herein described produces an equivalent effect as the single, rotated crystal of FIG. 8a.

Waveplate 821 transforms the polarization coordinate axes 810, 811 into 810' and 811'. Pulse 800 is projected onto said axes to form pulses 801, 802. Transit of birefringent crystal 820 imparts differential time delay between pulses 801, 802. Waveplate 822, with opposite rotation relative to waveplate 821, restores polarization axes 810', 811', to axes 810, 811. Restoration of said polarization axes further projects pulse 801 into components 801a, 801b, and projects pulse 802 into components 802a, 802b, where the 'a' pulses are polarization-aligned to axis 810 and the 'b' pulses are polarization-aligned to axis 811.

Figure 9A:
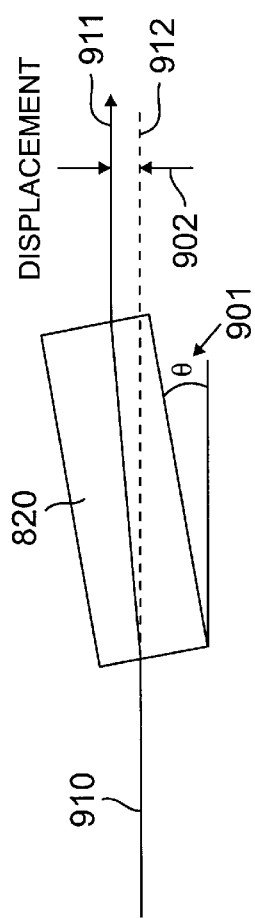
FIG. 9a illustrates a birefringent crystal inclined with respect to a transversing optical beam.

There is an important practical advantage to the employment of the scheme of FIG. 8b, which is more complicated scheme than that of FIG. 8a. This advantage is illustrated in reference to FIGS. 9a and 9b and the discussion related thereto. FIG. 9a illustrates birefringent crystal 820 which is inclined by amount 901 with respect to input light beam 910. Transit of light beam 910 through the crystal 820, for a small angle 901, imparts a displacement 902 between actual output beam 911 and where beam 910 would be 912 in the absence of inclined crystal 820. The displacement 902 is directly proportional to the length of the crystal 820. Reduction of the length of crystal 820 would reduce the degree of displacement 902, but that is contrary to the generation of substantial differential temporal delay.

Figure 9B:
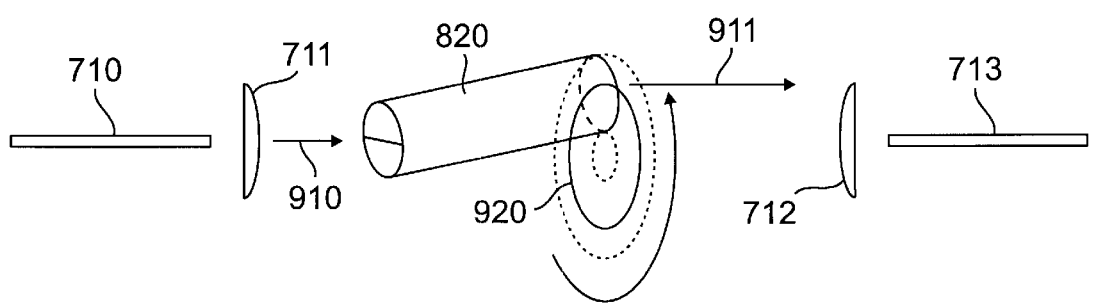
FIG. 9b illustrates the displacement of a transversing optical beam through an inclined birefringent crystal over a loci of rotation.
Figure 9C:
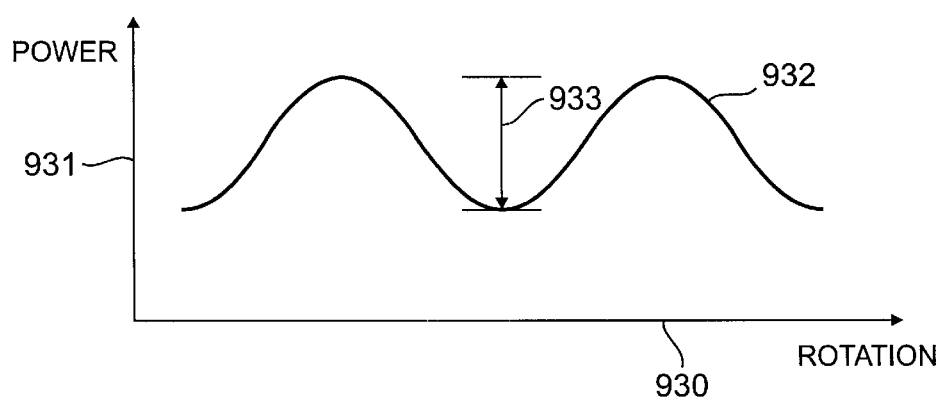
FIG. 9c illustrates a representative optical power signal as a function of the birefringent crystal rotation.

FIG. 9b illustrates crystal 820 in a configuration in which the crystal is rotated nominally about the axis normal to the crystal birefringent plane, but where there is persistent inclination of the crystal 820 to the optical axis 910. Beam 911 output from crystal 820 thereby traces a circle 920 in space. Light which travels through first optical fiber 710, is coupled by first lens 711 to form collimated beam 910, and transits crystal 820 produces light beam 911. Second lens 712 is intended to couple light beam 911 to second optical fiber 713. However, due to the displacement loci 920 of beam 911, the optical power which is received by second optical fiber varies with the rotation of crystal 820. FIG. 9c illustrates variation 932 of optical power 931 as a function of crystal rotation 930. It has been experimentally shown that the modulation depth 933 of the optical power on second optical fiber 713 can be substantial.

Figure 10A:
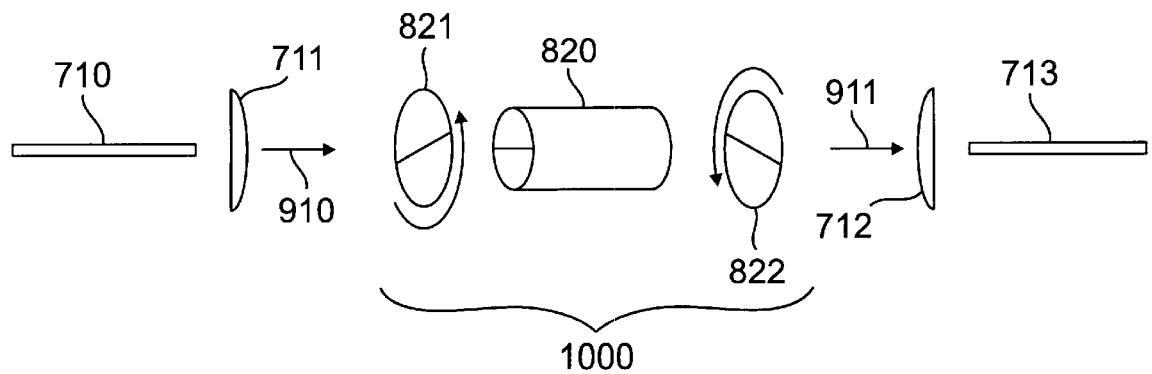
FIG. 10a illustrates a birefringent crystal preceded and followed by a waveplate.
Figure 10B:
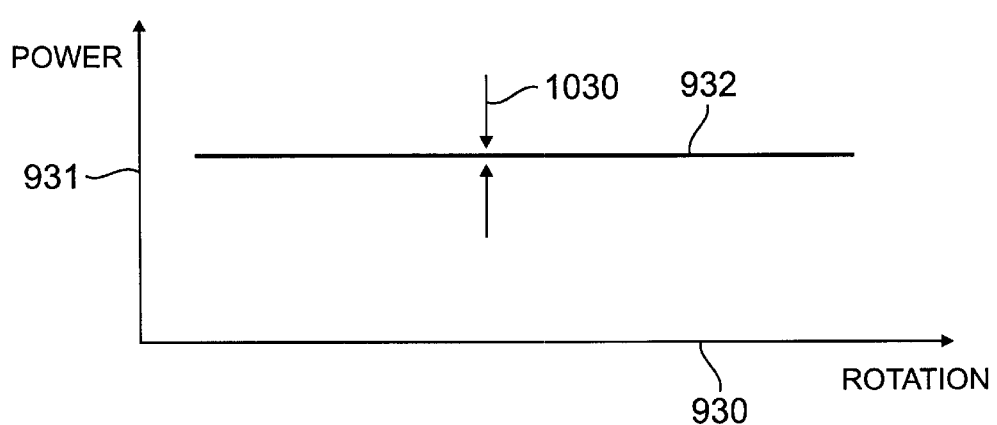
FIG. 10b illustrates a representative optical power signal as a function of the waveplate rotation.

As a consequence of substantial modulation depth 933, due to practical difficulties and costs with eliminating the inclination of crystal 820, the optical system of FIG. 8b, redrawn in FIG. 10a, may be preferred. Birefringent crystal 820 is preceded by first waveplate 821 and followed by second waveplate 822. A waveplate in practice can be made as thin as 50 $\mu$m, which may be substantially shorter than the birefringent crystal 820. To the extent the waveplates 821, 822 impart displacement of an optical beam due to small inclinations, the magnitude of the displacement may be substantially smaller. To impart the PMD equivalent to a single, rotated birefringent crystal, waveplates 821 and 822 are rotated in concert, and in opposing directions, while birefringent crystal 820 remains fixed. For light which travels along first optical fiber 710, is collimated by first lens 711 to form beam 910, and transits simple PMD-generating stage 1000, output beam 911 is focused by second lens 712 to second optical fiber 713. The modulation of the optical power 932 received by second optical fiber 713 may exhibit a modulation depth 1030, FIG. 10b, substantially smaller than modulation depth 933 FIG. 9c.

Figure 11A:
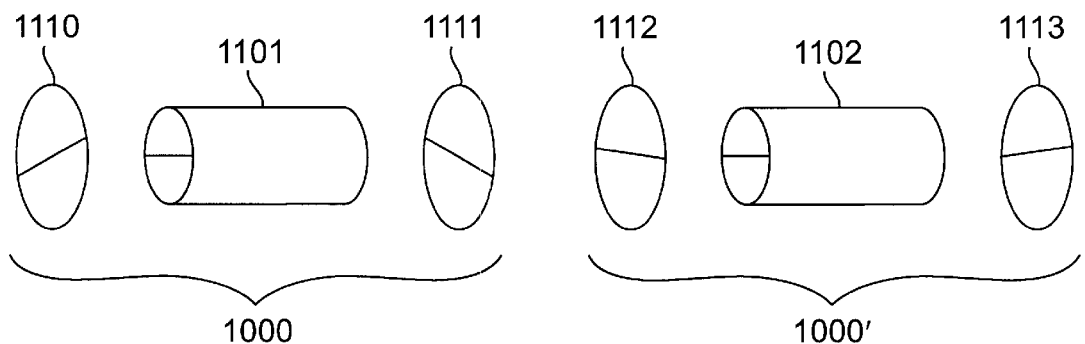
FIGS. 11a, 11b illustrate the replacement of two adjacent waveplates with a single waveplate.
Figure 11B:
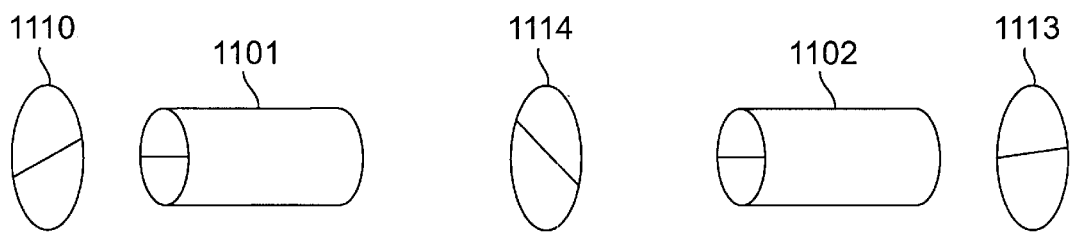
Figure 11C:
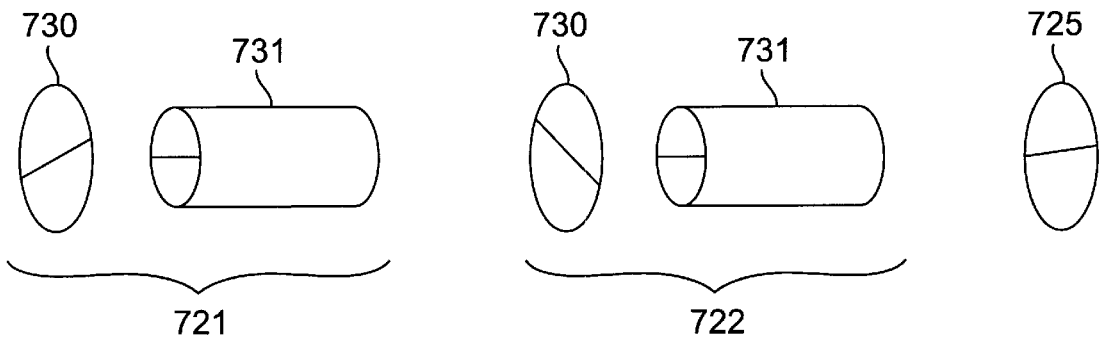
FIG. 11c illustrates the correspondence of the crystal concatenation with FIG. 7b.

FIG. 7a illustrates a PMD-generating apparatus consisting of a plurality of simple PMD-generating stages. Simple PMD-generating stage 1000 of FIG. 10a may be used for each simple PMD-generating stage, e.g. 721. However, FIG. 11 illustrates a possible simplification. Referring to FIG. 11a, simple PMD-generating stage 1000 comprises a first waveplate 1110, a birefringent crystal 1101, and a second waveplate 1111. Similarly simple PMD-generating stage 1000' comprises first waveplate 1112, birefringent crystal 1102, and second waveplate 1113. Because stages 1000 and 1000' are adjacent to one another, waveplates 1111 and 1112 are adjacent. FIG. 11b illustrates the combination of waveplates 1111 and 1112 into one waveplate 1114. An equivalence may be established if waveplates 1111, 1112, and 1114 are all half-wave waveplate. In this case, the rotation angle of waveplate 1114 is the sum of inclination angles of waveplates 1111 and 1112. FIG. 11c establishes a correspondence between the system of FIG. 11b and FIG. 7 b. From FIGS. 11b to 11c, crystal 1101 and waveplate 1110 are grouped as stage 721; crystal 1102 and waveplate 1114 are grouped as stage 722. This grouping is repeated for each birefringent crystal that is present in the PMD-generating apparatus. Lastly, waveplate 1113, the trailing waveplate, corresponds to waveplate 725. Waveplate 1113 is required to transform the polarization coordinate system back to the original input system.

The relative alignment of waveplates and birefringent crystals is an essential aspect of the predictability of the generated PMD. In accordance with one preferred embodiment of the present invention, alignment may be performed in three stages: 1) alignment of the waveplates to a external standard, 2) alignment of the birefringent crystals to the waveplates, and 3) mutual alignment of the birefringent crystal extraordinary axes. To align the waveplates, first two high-extinction-ratio polarizers are placed in an optical path. The polarizers are mutually rotated to maximally extinguish the optical beam output from the second polarizer. Second, a first waveplate, mounted and fixed on a rotation stage, is inserted between the two polarizers. The waveplate is subsequently rotated so as to again maximize the extinction of the optical beam output from the second polarizer. The rotation angle of the waveplate is recorded, and then the waveplate and rotation stage is removed from the light path. Subsequently, each waveplate, mounted and fixed on individual rotation stages, is inserted into the optical path, between the two polarizers, and the preceding alignment procedure is repeated.

For the second stage of the alignment procedure, one aligned waveplate is placed into the optical beam between the two polarizers, and one birefringent crystal is placed on the rotation stage behind the waveplate. The birefringent crystal is mounted onto a portion of the rotation stage which does not move, making the placement of the birefringent crystal stationary. With the birefringent crystal in position, the rotation of the crystal is manually adjusted to again maximize the extinction of the optical beam output from the second polarizer. The birefringent crystal is then fixed into this position. Note that at this point is remains ambiguous whether the ordinary or extraordinary axis of the birefringent crystal has been aligned with the first polarizer axis. Nonetheless, subsequently, each birefringent crystal, mounted to individual rotation stages with pre-aligned waveplates, is inserted into the optical path, between the two polarizers, and the preceding alignment procedure is repeated.

For the last stage of the alignment procedure, the ambiguity of ordinary or extraordinary axis alignment is resolved. Two rotation-stage assemblies, comprising an aligned waveplate and birefringent crystal, are placed in cascade in the optical beam, between the two polarizers. The optical spectrum of the optical beam output from the second polarizer is analyzed. Amplitude modulation of the optical spectrum indicates that the extraordinary axes of the two birefringent crystals are aligned, whereas no substantial modulation of the optical spectrum indicates that the extraordinary axes of the two birefringent crystals are oriented at 90 degrees from one another. The presence or absence of amplitude modulation of the optical spectrum is recorded. Subsequently, the one of the two rotation-stage assemblies is removed and replaced with another assembly. The determination of amplitude modulation of the optical spectrum is recorded. This procedure is repeated for all remaining rotation-stage assemblies.

Following the above-outlined alignment procedure, and any other such procedure that determines the optical axes of all optical components, all waveplate, birefringent crystal, and rotation stage assemblies are mounted in concatenation in an optical beam path. The first and second optical polarizers are removed.

Figure 12A:
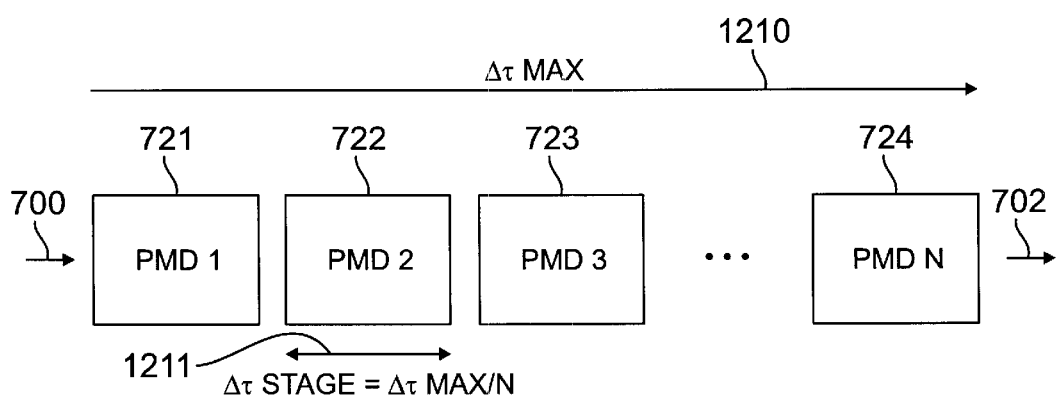
FIG. 12a illustrates a block diagram of a PMD emulator where each stage has the same DGD value.
Figure 12B:
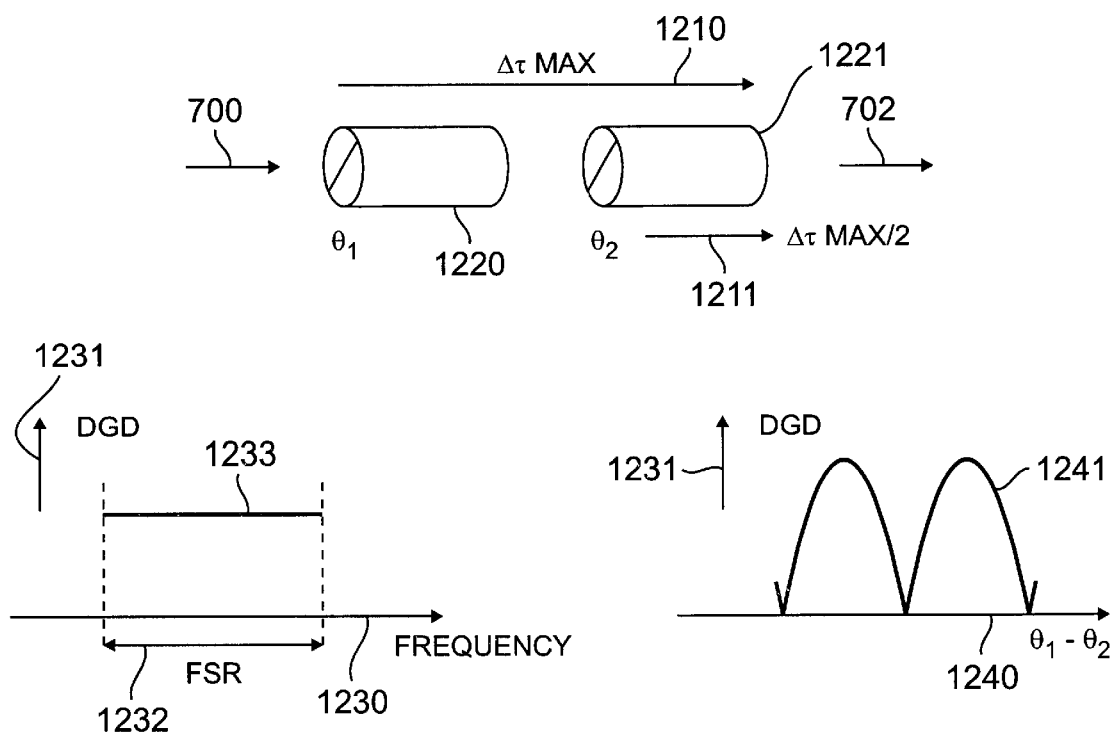
FIG. 12b illustrates just two birefringent crystals with some relative rotation, and the resultant DGD spectrum and DGD locus as a function of the mutual relative rotation.

Referring now to FIG. 12a, a concatenation of simple PMD-generating stages 721, 722, 723, 724, imparts PMD onto optical beam 702 from optical beam 700. A maximum value of DGD is attained when all of the PMD-generating stages are aligned, $\Delta\tau$ max 1210. FIG. 12a illustrates a case where the DGD values of all the PMD-generating stages are equal. For N stages, each stage has a DGD value of $\Delta\tau$ max/N, 1211. The case where all the DGD values of all simple PMD-generating stages are equal is particularly simple to analyze. FIG. 12b illustrates two equal-length birefringent crystals 1220, 1221, which are rotated with respect to one another. The maximum DGD value is $\Delta\tau$ max 1210. For equal length crystals, the DGD values 1233 as a function of frequency 1230 are constant across the free-spectral range 1232. The absolute value of DGD can range between zero and $\Delta\tau$ max, and is controlled by the relative rotation between the two crystals 1220, 1221. The loci of DGD values 1241 as a function of relative crystal rotation 1240 has the form of: $\Delta\tau$ max|cos (theta2−theta1)|. The generation of DGD which is independently of frequency is the simplest form of PMD, and one which is essential for the basic testing of PMD compensators.

Figure 13A:
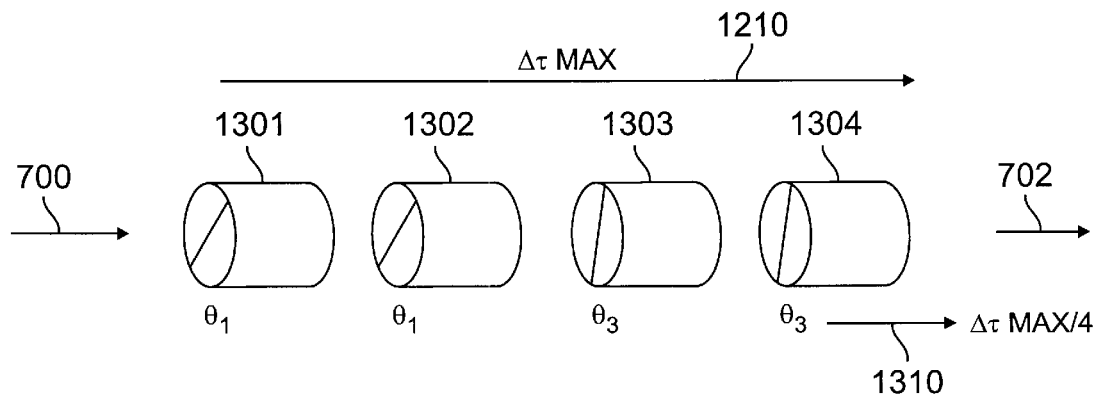
FIG. 13a illustrates four birefringent crystals grouped in two pairs, where within each pair the extraordinary axes are aligned.
Figure 13B:
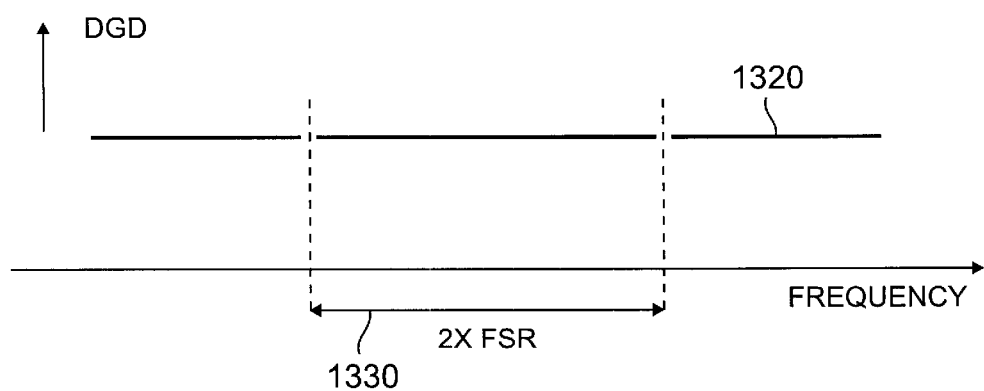
FIG. 13b illustrates a representative resultant DGD spectrum.

FIG. 13a illustrates four simple PMD-generating stages, designed so that the maximum attainable DGD value $\Delta\rho$ max remains equal to that denoted by 1210. In the case where all DGD values from stages 1301–1304 are the same, the imparted PMD is simple to analyze. When all DGD values are the same, then each stage has a DGD of $\Delta\tau$ max/4, 1310. FIGS. 13a and b indicate an important configuration wherein PMD-generating stages 1301 and 1302 are aligned along the fast axis, and stages 1303 and 1304 are aligned along the fast axis. Rotation is performed wherein the first pair, 1301 and 1302, is rotated relative to the second pair, 1303 and 1304. The result is a fixed DGD value 1320 in frequency over the FSR. Note that the FSR 1330 is twice the FSR 1232 in FIG. 12b because the per-stage DGD value $\Delta\tau$ max/4, 1310, of the system in FIG. 13a is one-half the per-stage DGD value $\Delta\tau$ max/2, 1211.

Figure 13C:
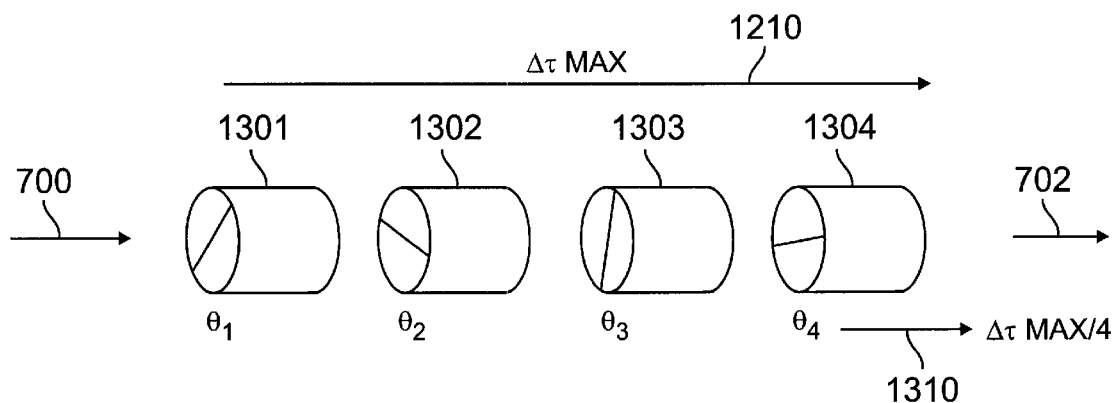
FIG. 13c illustrates four birefringent crystals with distinct orientations.
Figure 13D:
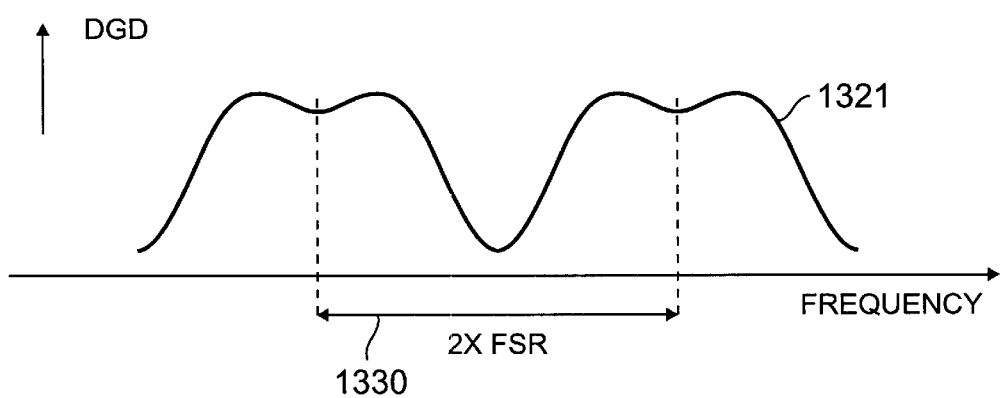
FIG. 13d illustrates a representative resultant DGD spectrum that exhibits variation of DGD with frequency.

FIG. 13c illustrates a more complex configuration of the four simple PMD-generating stage configuration. The crystals 1301, 1302, 1303, 1304, have in general distinct rotations. The resultant DGD spectrum 1321 exhibits modulation over the FSR 1330. Here is the first example of the preferred embodiment description where complex PMD, one which begins to emulate the true behavior of birefringent fiber, can be generated. A detailed analysis of a PMD-generating apparatus consisting of N like stages shows that the functional form of the DGD $\Delta\tau$ follows $$\Delta\tau = \sqrt{DC(\theta_1, \theta_2, \ldots) + \sum_{n=1}^{N} AC_n(\theta_1, \theta_2, \ldots) \cdot \cos\left(\frac{2\pi n(f - f_o)}{FSR}\right)} \quad (1)$$

where the DC term is function of ($\theta 1, \theta 2, \ldots$) but not of the frequency, the N AC terms are each functions of ($\theta 1, \theta 2, \ldots$) but not of frequency, and the frequency dependence follows the cosine form, weighted by the respective AC terms. Note that the N AC terms are in fact correlated and not orthogonal. It can be proved analytically that the $AC_{13}N$ and $AC_{13}N-1$ terms are identically zero. Thus when there are only two simple PMD-generating stages, there is no modulation of the DGD spectrum over the FSR. However, with more than two stages, there is modulation of the DGD spectrum. Equation 1 further indicates that there is a maximum rate, $2\pi(N-2)/FSR$, that the DGD spectrum can change in frequency with this emulation apparatus. This has important implications because the design of a PMD emulator may require a substantial amount of DGD modulation across the bandwidth of an optical pulse.

Figure 14A:
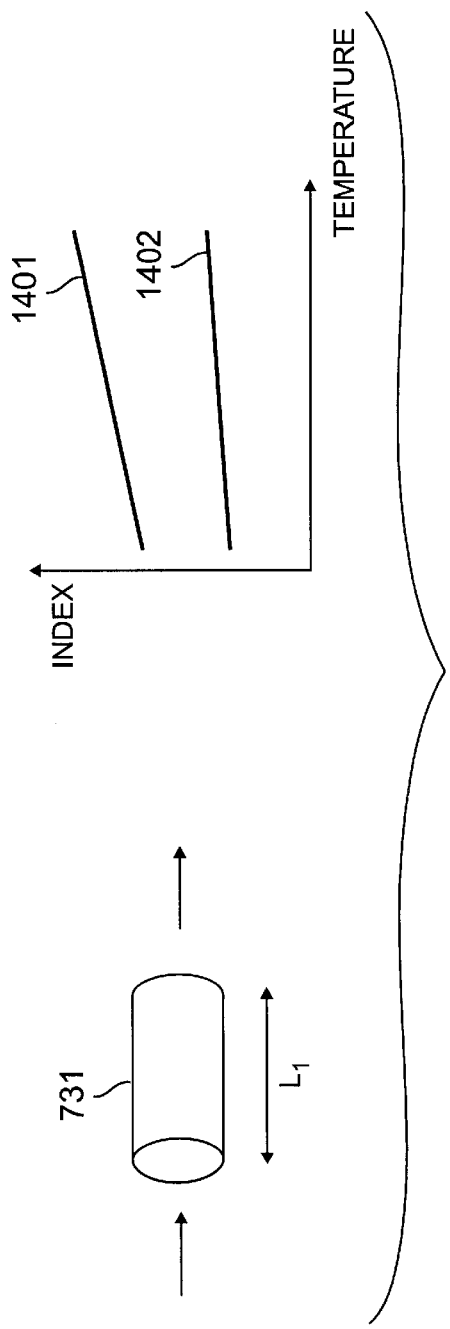
FIGS. 14a and 14b illustrate representative temperature dependencies of the ordinary and extraordinary indices of refraction for two distinct birefringent crystals.
Figure 14B:
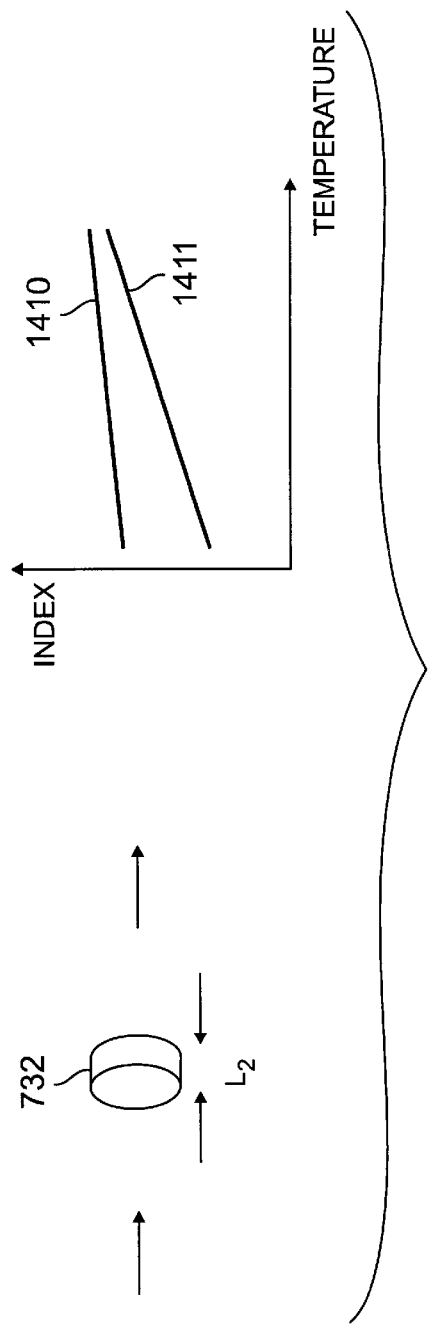

Referring now to FIG. 14, description of FIG. 7a item 721 indicated that two birefringent crystals 731, 732, may be preferably employed for the generation of DGD. The purpose of two crystals of distinct material systems is to compensate for the temperature variation that either crystal alone exhibits. FIG. 14a illustrates the temperature dependence of the two refractive indices of birefringent crystal 731 with length L1. In general the temperature dependence on refraction index for one axis, say 1401, is different than the orthogonal axis, 1402. The difference between the two refractive indices, the crystal birefringence, accordingly changes as a function of temperature. To cancel the effect of temperature dependence, a second crystal 732 of length L2 is used. The second crystal 732 must possess refractive index curves, 1410 and 1411, that have different temperature dependent slopes than first crystal 731. Preferably the temperature dependence of second crystal 732 is much stronger than that of the first crystal. Upon combination of the two crystals 731, 732, in the proper manner, and with proper length ratio, temperature dependence along the fast and slow axes remains 1420, 1421, but the slopes of the refractive index change with temperature are the same. Therefore, the difference between the refractive indices, the composite crystal birefringence, remains invariant to temperature. For example, a yttrium ortho-vanadate (YVO4) crystal, which is positive uniaxial, may be combined with a lithium niobate (LiNbO3) crystal, which is negative uniaxial, to produce reduction of temperature dependence. The extraordinary axes of the two crystals are aligned, and the length ratio YVO4 to LiNbO3 must be about 10:1.

An advantage of the embodiments of the PMD emulator heretofore disclosed is that the waveplates and/or birefringent crystals may be rotated using a precise rotation apparatus. FIG. 15a illustrates a means for the rotation of the simple PMD-generation stage component(s). A optical component is attached to a rotation stage 1500 which has a clear aperture. A motor 1501 is used to drive the rotation of stage 1500. A motor encoder 1502 is coupled to the motor 1501 so as to encode the revolutions of the motor. An encoder recorder 1503 is attached to the motor encoder 1502 to record the signs generated by said encoder 1502. Alternatively, FIG. 15b illustrates another means for rotation and recording. A optical component of a simple PMD-generation stage is attached to a rotation stage 1500 which has a clear aperture. A motor 1501 is used to drive the rotation stage 1500. A separate rotation encoder 1510 is further attached to the rotation stage 1500. The rotation encoder measures the rotation of the rotation stage 1500. The signals of the rotation encoder 1510 are recorded by encoder recorder 1511.

Figure 16:
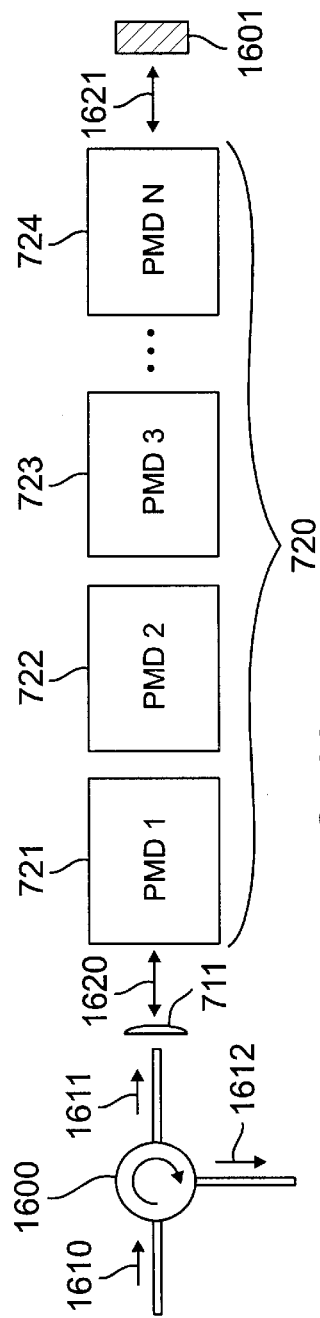
FIG. 16 illustrates a PMD emulator configured for double-pass and a preceding optical circulator to discriminate forward-going and backward-going light.

FIG. 16 illustrates an alternative and preferable embodiment of the invention herein disclosed. PMD emulator 720, further comprised of a plurality of simple PMD stages, 721–724, is placed between collimating lens 711 and mirror 1601. Optical circulator 1600 receives forward-going optical beam which travels on first optical fiber 1610. Second optical fiber 1611 receives light from circulator 1600 which originated from forward-going optical beam 1610. Coupling lens 711 receives the forward-going beam from second optical fiber 1611 and collimates the light to form forward-going beam 1620. Forward-going beam 1620 transits PMD emulator 720 and is output to beam 1621. Mirror 1601 reflects beam 1621, which is subsequently received by PMD generator 720. The backward-going beam returns to coupling lens 711 and is received by second optical fiber 1611. Optical circulator 1600 receives the backward-going beam and redirects the backward-going beam to third optical fiber 1612. The advantage of this double-pass configuration is the extended production of PMD without the use of additional simple PMD stages.

Figure 17A:
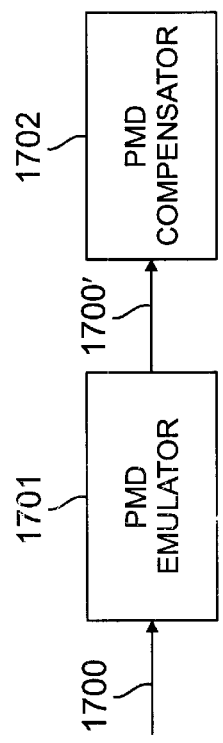
FIGS. 17a, 17b, and 17c show block diagrams which illustrate methods to test a PMD compensator using a PMD emulator.
Figure 17B:
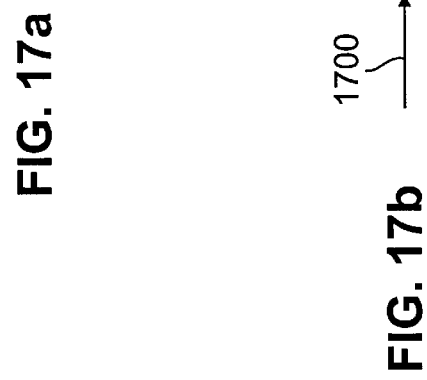
Figure 17C:
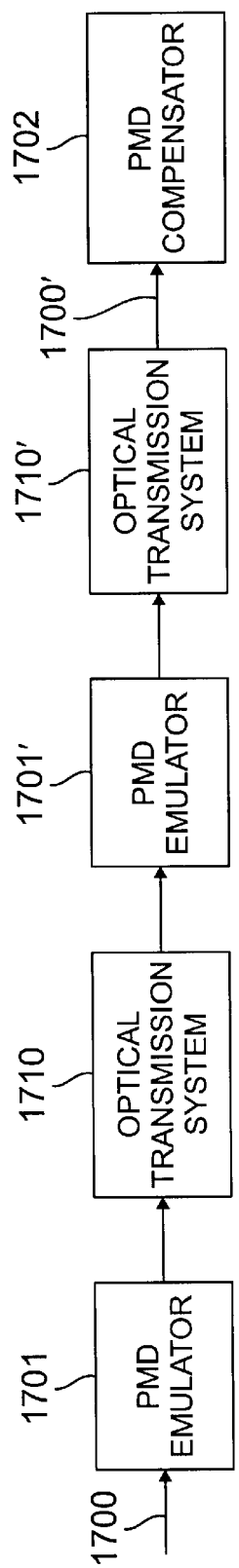

Several uses of a PMD emulator, as disclosed herein, are illustrated in FIGS. 17a–c. Referring to FIG. 17a, input optical beam 1700 is received by PMD emulator 1701. The PMD emulator imparts PMD onto the beam, producing impaired optical beam 1700'. A PMD compensator 1702 subsequently receives impaired optical beam 1700'. The purpose of the PMD compensator 1702 is to substantially restore the impaired optical beam 1700' for subsequent detection. FIG. 17b illustrates an optical beam 1700 which is received by PMD emulator 1701. The resultant impaired optical beam is received by an optical transmission system 1710. The optical beam 1700', with accumulated PMD and transmission impairments, is subsequently received by a PMD compensator 1702. FIG. 16c illustrates an optical beam 1700 which is received by first PMD emulator 1701, then first optical transmission system 1710, second PMD emulator 1701', and second transmission system 1710', producing as a result impaired optical beam 1700'. PMD compensator 1702 subsequently receives the impaired optical signal 1700' for substantial restoration.

Figure 18:
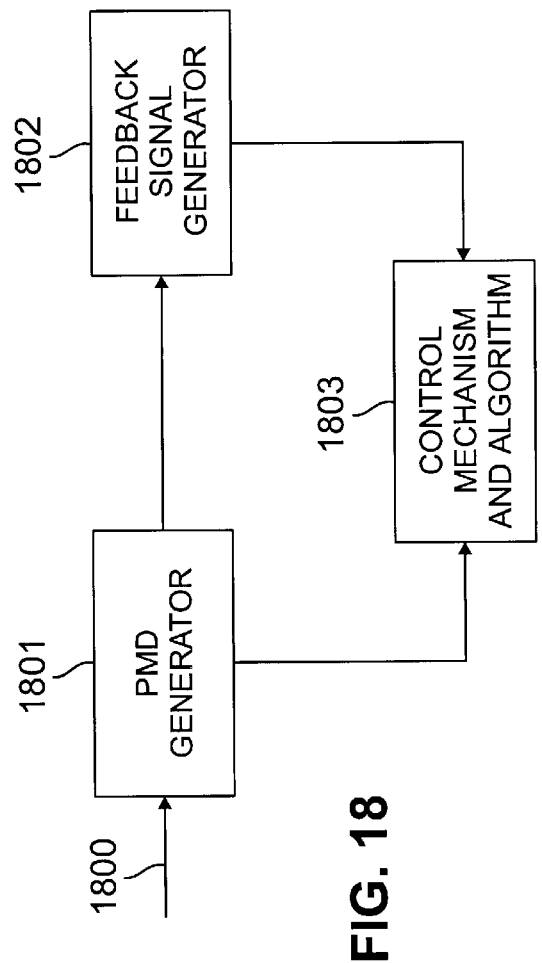
FIG. 18 shows a block diagram of a PMD compensator built from a PMD generator, a feedback signal generator, and a controller.

As described in the Background of the Invention, an PMD emulator 1801 in FIG. 18 may be used in combination with a feedback signal generator 1802 and control mechanism and algorithm 1803. Together blocks 1801, 1802, and 1803 form a closed loop system which can track and correct for the changing state of PMD generated by an optical transmission system.

The foregoing description of specific embodiments of the invention has been presented for the purposes of illustration and description. It is not intended to be exhaustive or to limit the invention to the precise forms disclosed, and many modifications and variations are possible in light of the above teachings. For example, intentional multiple reflections may take place within each birefringent crystal for the purpose of enhancing the accumulated DGD of each stage. The embodiments were chosen and described to best explain the principles of the invention and its practical application, and to thereby enable others skilled in the art to best utilize the invention. It is intended that the scope of the invention be limited only by the claims appended hereto.

What I claim is:

1. A polarization-mode-dispersion generating apparatus comprising:

A PMD-generating stage which further comprises a first waveplate element, a first birefringent crystal element, and a second waveplate element, all positioned to provide a clear light-path through each element in succession in the order herein listed;

A plurality of PMD-generating stages all positioned to provide a clear light-path through each stage in succession.

2. An apparatus as in claim 1, wherein:

First and second waveplates are lambda/4 waveplates.

3. An apparatus as in claim 1, wherein:

First and second waveplates are lambda/2 waveplates.

4. An apparatus as in claim 1, further comprising:

First and second optical fibers, wherein:

The input light travels through the first optical fiber to be received by the PMD-generating apparatus, and;

The light, after traveling through the PMD-generating apparatus, is then received by the second optical fiber.

5. An apparatus as in claim 4, further comprising:

A first lens which directs the input light from the first optical fiber to the PMD-generating apparatus;

A second lens which directs the light output from the PMD-generating apparatus to the second optical fiber.

6. An apparatus as in claim 1, wherein:

The adjacent waveplate elements located between birefringent elements of two adjacent PMD-generating stages are replaced with a single waveplate element.

7. An apparatus as in claim 6, wherein:

The single-waveplate element is a lambda/2 waveplate.

8. An apparatus as in claim 1, further comprising:

A means for the rotation of the waveplate elements about the axis normal to the birefringent plane of said elements.

9. An apparatus as in claim 8, wherein:

The rotation of each waveplate element is under independent operation from the rotation of all other waveplate elements.

10. An apparatus as in claim 9, further comprising:

A controller for the coordination of the waveplate element rotations so as to control the magnitude of DGD produced by the PMD-generating apparatus.

11. An apparatus as in claim 9, further comprising:

A controller for the coordination of the waveplate element rotations so as to control the degree of modulation of the DGD spectrum produced by the PMD-generating apparatus.

12. An apparatus as in claim 11, wherein:

The DGD produced by the PMD-generating apparatus exhibits a fixed value in the frequency spectrum;

A controller for the coordination of waveplate element rotations so as to vary the magnitude of the DGD produced by the PMD-generating apparatus while maintaining a fixed DGD value in the frequency spectrum.

13. An apparatus as in claim 9, further comprising:

A controller for the coordination of waveplate element rotations so as to control the peak, average, and minimum value of DGD over the frequency spectrum.

14. An apparatus as in claim 9, further comprising:

The means of rotation is a motor-driven rotation apparatus;

The drive of the motor provides for the encoding of the motor revolutions;

An apparatus to record the encoded motor revolutions so as to monitor the angular position of the waveplate element.

15. An apparatus as in claim 9, further comprising:

The means of rotation is a motor-driven rotation apparatus;

A rotation-encoding apparatus is affixed to the rotation apparatus;

The rotation-encoding apparatus detects the rotation of the rotation apparatus;

An apparatus to record the encoded signal from the rotation-encoding apparatus, so as to monitor the angular position of the waveplate element.

16. An apparatus as in claim 1, further comprising:

A means for the rotation of the birefringent elements about the axis normal to the birefringent plane of said elements.

17. An apparatus as in claim 16, further comprising:

The means of rotation is a motor-driven rotation apparatus;

The drive of the motor provides for the encoding of the motor revolutions;

An apparatus to record the encoded motor revolutions so as to monitor the angular position of the birefringent element.

18. An apparatus as in claim 16, further comprising:

The means of rotation is a motor-driven rotation apparatus;

A rotation-encoding apparatus is affixed to the rotation apparatus;

The rotation-encoding apparatus detects the rotation of the rotation apparatus;

An apparatus to record the encoded signal from the rotation-encoding apparatus, so as to monitor the angular position of the birefringent element.

19. An apparatus as in claim 1, wherein:

The birefringent elements are of the same length.

20. An apparatus as in claim 1, further comprising:

Each birefringent element exhibits a systematic and fixed rotation about the axis normal to birefringent plane of said element relative to the adjacent birefringent elements.

21. An apparatus as in claim 1, wherein:

The maximum accrued DGD of all PMD-generating stages is substantively equal to the data rate of an input optical bit stream.

22. An apparatus as in claim 1, wherein:

Each birefringent element is replaced with a composite birefringent element composed of two dissimilar birefringent materials constructed and aligned so as to reduce the temperature dependence of the composite birefringent element;

The composite birefringent element is further designed to exhibit the same free-spectral range as the single-material birefringent element.

23. An apparatus as in claim 1, wherein:

The birefringent crystal element is constructed with yttrium-orthovanadate crystal.

24. An apparatus as in claim 1, wherein:

The birefringent crystal element is constructed with rutile crystal.

25. An apparatus as in claim 1, wherein:

The birefringent crystal element is constructed with calcite crystal.

26. An apparatus as in claim 1, wherein:

The birefringent crystal element is constructed with alpha-Barium Borate crystal.

27. An apparatus as in claim 22, wherein:

The composite birefringent crystal element is constructed with yttrium-orthovanadate crystal and lithium-niobate crystal.

28. An apparatus as in claim 22, wherein:

The composite birefringent crystal element is constructed with rutile crystal and lithium-niobate crystal.

29. An apparatus as in claim 22, wherein:

The composite birefringent crystal element is constructed with calcite crystal and lithium-niobate crystal.

30. An apparatus as in claim 1, further comprising:

First, second, and third optical fibers, an optical circulator, and a mirror, wherein The forward-going input light travels through the first optical fiber to be received by the optical circulator;

The second optical fiber receives the forward-going light from the optical circulator which originates from the forward-going light that travels through the first optical fiber;

The forward-going light which travels through the second optical fiber is received by the PMD-generating apparatus;

The forward-going light which is output from PMD-generating apparatus is incident on and reflected by the mirror;

The backward-going light from the mirror is received by the PMD-generating device;

The second optical fiber receives the backward-going light output from the PMD-generating device;

The optical circulator receives the backward-going light which travels along the second optical fiber;

The third optical fiber receives the backward-going light from the optical circulator.

31. An apparatus as in claim 30, further comprising:

A lens which directs the forward-going light from the second optical fiber to the PMD-generating apparatus, and The same lens which directs the backward-going light from the PMD-generating apparatus to the second optical fiber.

32. A polarization-mode-dispersion compensator apparatus comprising:

A PMD generator which receives impaired optical signals from an external system;

A PMD generator further comprising:

A PMD-generating stage which further comprises a first waveplate element, a first birefringent crystal element, and a second waveplate element, all positioned to provide a clear light-path through each element in succession in the order herein listed;

A plurality of PMD-generating stages all positioned to provide a clear light-path through each stage in succession;

A receiver which receives the optical signals from the PMD generator output;

An error signal derived from the receiver that monitors the degree of PMD due to the combined effect of the external system and the PMD generator;

A controller that receives the error signal and in turn coordinates the rotation of at least one waveplate element, located within the PMD generator, so as to reduce the magnitude of the error signal.

33. A method of testing a PMD compensator comprising the steps of:

The transmission of an optical signal through a PMD emulator, the optical path of a PMD emulator further comprising:

A PMD-generating stage which further comprises a first waveplate element, a first birefringent crystal element, and a second waveplate element, all positioned to provide a clear light-path through each element in succession in the order herein listed;

A plurality of PMD-generating stages all positioned to provide a clear light-path through each stage in succession;

The direction of the PMD-impaired optical signal to the PMD compensator under test;

The monitoring of the output of the PMD compensator.

34. A method of testing a PMD compensator as in claim 33 wherein:

The PMD-impaired optical signal output from the PMD emulator is further transmitted through an optical transmission system where said system may impart optical nonlinearities, optical dispersion, noise accumulation, loss, and polarization-dependent loss;

The direction of the impaired optical signal to the PMD compensator under test;

The monitoring of the output of the PMD compensator.

35. A method of testing a PMD compensator as in claim 33 wherein:

The PMD-impaired optical signal output from the PMD emulator is further transmitted through an alternating chain of optical transmission systems, each of which may impart optical nonlinearities and dispersion and noise accumulation and loss and polarization-dependent loss, and PMD emulator stages;

The direction of the impaired optical signal to the PMD compensator under test;

The monitoring of the output of the PMD compensator.

* * * * *